US011211171B2

United States Patent
Sanger

(10) Patent No.: US 11,211,171 B2
(45) Date of Patent: Dec. 28, 2021

(54) SYSTEMS AND METHODS FOR IMPROVING SMART CITY AND SMART REGION ARCHITECTURES

(71) Applicant: Tele-Commuter Resources, Inc., St. Paul, MN (US)

(72) Inventor: John Sanger, St. Paul, MN (US)

(73) Assignee: TELE-COMMUTER RESOURCES, INC., St. Paul, MN (US)

( * ) Notice: Subject to any disclaimer, the term of this patent is extended or adjusted under 35 U.S.C. 154(b) by 36 days.

(21) Appl. No.: 16/740,199

(22) Filed: Jan. 10, 2020

(65) Prior Publication Data

US 2020/0227177 A1 Jul. 16, 2020

Related U.S. Application Data

(60) Provisional application No. 62/791,395, filed on Jan. 11, 2019.

(51) Int. Cl.
| | |
|---|---|
| *G16Y 10/80* | (2020.01) |
| *G16Y 10/35* | (2020.01) |
| *G16Y 40/20* | (2020.01) |
| *G16Y 40/35* | (2020.01) |
| *G16Y 20/20* | (2020.01) |
| *G16Y 40/10* | (2020.01) |
| *G16Y 20/30* | (2020.01) |

(52) U.S. Cl.
CPC .............. *G16Y 40/20* (2020.01); *G16Y 10/35* (2020.01); *G16Y 10/80* (2020.01); *G16Y 20/20* (2020.01); *G16Y 20/30* (2020.01); *G16Y 40/10* (2020.01); *G16Y 40/35* (2020.01)

(58) Field of Classification Search
CPC ........ G06Q 10/10; G06Q 10/04; G06Q 50/26; G06Q 10/06; G16Y 40/20; G16Y 10/35; G16Y 10/80; G16Y 20/20; G16Y 40/10; G16Y 40/35; G16Y 20/30
See application file for complete search history.

(56) References Cited

U.S. PATENT DOCUMENTS

| | | | |
|---|---|---|---|
| 2004/0036716 A1* | 2/2004 | Jordahl | G06F 16/24578 715/713 |
| 2008/0059457 A1* | 3/2008 | Ohnemus | G06Q 40/02 |
| 2013/0166346 A1* | 6/2013 | Al-Zuhair | G06Q 10/0635 705/7.28 |
| 2021/0034679 A1* | 2/2021 | Cristache | G16Y 40/35 |

* cited by examiner

*Primary Examiner* — Frantz B Jean

(74) *Attorney, Agent, or Firm* — Patterson Thuente Pedersen, P.A.

(57) ABSTRACT

Improved systems, methods, and architectures to enhance decision making in Smart Cities and Smart Regions. A system includes an index structure including a first hierarchical data structure including a first hierarchical score based on a plurality of first-level elements, each of the plurality of first-level elements having a respective weighting, and a second hierarchical data structure including a plurality of second hierarchical scores based on a plurality of second-level elements, each of the plurality of second-level elements having a respective weighting, such that the first hierarchical score is based on the plurality of second hierarchical scores through an index factor; and a computer-implemented regional monitor engine to manage local access to a plurality of external data sources to coordinate writes to the index structure.

18 Claims, 24 Drawing Sheets

The Data:

* Unit Delivered
* Unit Costs
* Qualitative Codes
* Source Differentials

* Regional Competitiveness
* Sector Performance
* Best Practices/Outcomes

Weighting as % of 100

Grade Assigned by Definition

Exponential Value assigned to Grade

The Score

| Element | Weight |
|---|---|
| Element 1 | 30 |
| Element 2 | 15 |
| Element 3 | 25 |
| Element 4 | 30 |
| Total Points to Spread | 100 |

FIG. 12

| Regional Profile |
|---|
| Population |
| Ethnicity |
| Demographics |
| Eco-System |
| Origin |
| Employment Base |
| Fiscal Stability |
| Government |
| Per Capita ——— |

FIG. 13

| | Scoring Interpretation |
|---|---|
| A | Exceeds all performance standards |
| B | |
| C | |
| D | |
| F | Violates all standards |

| Outcome | Grade | Equivalence |
|---|---|---|
| Desired | A | 1 |
| Acceptable | B | 2 |
| Marginal | C | 4 |
| Undesirable | D | 8 |
| Violates Standards | F | 16 |

FIG. 18

SYSTEMS AND METHODS FOR IMPROVING SMART CITY AND SMART REGION ARCHITECTURES

CROSS-REFERENCE TO RELATED APPLICATIONS

The present application claims the benefit of U.S. Provisional Application No. 62/791,395, filed Jan. 11, 2019, which is fully incorporated by reference herein. The present application is also related to U.S. Patent Application Publication No. 2003/0135599 (U.S. application Ser. No. 10/256,532) filed Sep. 27, 2002, and U.S. Patent Application Publication No. 2016/0171425 (U.S. application Ser. No. 14/966,153) filed Dec. 11, 2015, each of which is incorporated herein in its entirety.

TECHNICAL FIELD

Embodiments relate generally to systems, methods, and architectures for improving Smart Cities and Smart Regions. More particularly, embodiments improve connectivity and data collection for Smart Cities and Smart Regions.

BACKGROUND

A Smart City is an urban area that uses different types of electronic data collection sensors to supply information which is used to manage assets and resources efficiently. The goal of the Smart City is to gather information to enhance decision making. Further, by integrating rural and urban economies, a Smart Region can be created. There is a need for improved systems, methods, and architectures to enhance decision making in these areas.

Technological developments have become ubiquitous with modern society but the integration of these advancements is often slow and cumbersome. There is a need for improved systems, methods, and architectures to better implement new technologies in Smart Cities and Smart Regions while preventing unequal access to information. To compound these needs, governments at many levels use organizational structures that encourage data silos, mitigating the spread of information and leverage of resources to address complex problems. Without proper sharing of data, both among and within governments, it can be challenging for citizenry to effectively make informed decisions for their community or to assert their role in civic leadership.

SUMMARY

An improved Smart Region architecture can support and leverage new technologies in a uniform implementation throughout a Smart City or Smart Region.

In an embodiment, a system for coordinating a plurality of data sources comprises an index structure including: a first hierarchical data structure comprising a first hierarchical score based on a plurality of first-level elements, each of the plurality of first-level elements having a respective weighting, and a second hierarchical data structure comprising a plurality of second hierarchical scores based on a plurality of second-level elements, each of the plurality of second-level elements having a respective weighting, wherein the first hierarchical score is based on the plurality of second hierarchical scores through an index factor; a computing platform including computing hardware of at least one processor and memory operably coupled to the at least one processor; and instructions that, when executed on the computing platform, cause the computing platform to implement: a regional monitor engine configured to manage local access to a plurality of external data sources to coordinate writes to the index structure.

In an embodiment, a method for coordinating a plurality of data sources comprises providing an index structure including: a first hierarchical data structure comprising a first hierarchical score based on a plurality of first-level elements, each of the plurality of first-level elements having a respective weighting, and a second hierarchical data structure comprising a plurality of second hierarchical scores based on a plurality of second-level elements, each of the plurality of second-level elements having a respective weighting, wherein the first hierarchical score is based on the plurality of second hierarchical scores through an index factor; managing local access to a plurality of external data sources to coordinate writes to the index structure; updating the plurality of second-level elements from the plurality of external data sources; verifying the update to the plurality of second-level elements; evaluating the verified plurality of second-level elements; applying the index factor; and calculating the plurality of second hierarchical scores and the first hierarchical score.

In an embodiment, a system for coordinating a plurality of data sources comprises means for providing an index structure including: a first hierarchical data structure comprising a first hierarchical score based on a plurality of first-level elements, each of the plurality of first-level elements having a respective weighting, and a second hierarchical data structure comprising a plurality of second hierarchical scores based on a plurality of second-level elements, each of the plurality of second-level elements having a respective weighting, wherein the first hierarchical score is based on the plurality of second hierarchical scores through an index factor; means for managing local access to a plurality of external data sources to coordinate writes to the index structure; means for updating the index structure from the plurality of external data sources according to a time-based trigger or an event-based trigger; means for verifying the updated index structure; and means for analyzing the verified index structure by evaluating the verified plurality of second-level elements, applying the index factor, and calculating the plurality of second hierarchical scores and the first hierarchical score.

In an embodiment, the improved Smart Region architecture can comprise dynamically determining the boundaries of a Smart Region based on the social-cultural-economic orientation to a Smart City and a distributed city model. A distributed city model is a representation of a number of community types in a distributive hierarchy. In an embodiment, a distributed city model can comprise a representation of six community types, such as dispersed housing, small towns, regional centers, suburbs, inner city neighborhoods, and central business districts.

In an embodiment, the improved Smart Region architecture can comprise telecenter networks to assist in connecting and educating members of a community. In embodiments, telecenter networks can be specific to regions, communities, or neighborhoods.

In an embodiment, the improved Smart Region architecture comprises a regional monitor that collects, stores, and organizes community data from multiple sources. The multiple data sources can be external to an index structure. Accordingly, a regional monitor coordinates updates to the data structure.

In an embodiment, the regional monitor comprises a regional profiling module. In an embodiment, the regional profiling module is configured to implement geo-political regional profiles for each participating Smart Region to ensure accurate comparisons between the Smart Regions. In an embodiment, geographic, social, and economic characteristics can be recorded under each regional profile. Characteristics of regional profiles can include population, ethnicity, demographics, eco-system, origin, employment base, fiscal stability, government, and per capita statistics. In an embodiment, the regional profiling module can allow for performance comparisons among participating regions regardless of location.

In an embodiment, the improved Smart Region architecture comprises a knowledge engine configured to maintain the integrity of the database, automatically perform all of the calculations that update the scoring process, extend the results of each element's changes throughout the system, and recalculate scores for components and regional profiles.

In an embodiment, the knowledge engine is configured to periodically analyze input data for key indicators. In an embodiment the knowledge engine categorizes key indicators into key levels.

In an embodiment, the knowledge engine comprises an input generator module to maintain the currency of the data. In an embodiment the input generator module can update data on a time-based sequence or based on event occurrence.

In an embodiment, the knowledge engine comprises an auditor module to verify the updated data. The auditor module can be responsible for updating scoring interpretations, the contact person's contact information, changes to stakeholder profiles, and changes to regional profiles.

In an embodiment, the knowledge engine comprises an analysis module to properly sequence execution of interactive processing to ensure consistent, accurate scoring outcomes. In an embodiment, the analysis module updates the evaluation input, and other sources, applies the weights, verifies the numeric equivalency values, and calculates the score for each element. Once updated, the analysis module then updates any data relationship changes, stakeholder alert changes, or other necessary changes based on the input. In an embodiment, the analysis module generates trends, histories, tracking, and forecasting reports.

In an embodiment, the knowledge engine comprises a report generator module to produce specialized reports based upon areas of interest, impact potential, and/or trends. In an embodiment, the report generator module automates distribution of the specialized reports based upon a subscription list.

In an embodiment, the knowledge engine comprises an inquiry module to provide access to data through a web portal. In an embodiment, the inquiry module includes preformatted customizable reports with variable field selection, sorting, and totaling functions. Additionally, the inquiry module can allow for new format requests of existing reports.

In an embodiment, the regional monitor comprises an index structure separating components into levels of detail. In an embodiment, the index structure can weigh each component relative to the other components within the assigned level of detail. In an embodiment, the index structure can further separate components into additional categories. In an embodiment, the index structure can update components at different frequencies based on the rate of new data, ownership of the data, and the best means of data transmittal.

In an embodiment, an evaluation grade can be calculated for each component. In an embodiment, the evaluation grades can be based upon an A, B, C classification system. In an embodiment the evaluation grade can be converted into a numerically equivalent evaluation score using an exponential structure. In an embodiment, the evaluation score can be based on at least one of the weights of each component in the index structure or the numerical equivalent of the evaluation grade. In an embodiment, the evaluation score can be an exponential value to highlight the problematic components.

In an embodiment, a variety of elements relevant to the component can be considered when calculating an evaluation score. In such an embodiment, each element can have a specific weight and criteria set depending on the relevance of the element to the evaluation score. Further, each element can have an extensive profile record of sub-elements. In an embodiment, element data is maintained by the input generator module, the auditor module, and the analysis module.

A primary differentiator over existing systems is that the regional monitor gathers inputs from the source closest to the actual source of the activity before sub-elements are developed. Accordingly, embodiments provide much better analysis if engaged as part of the Smart City/Region architecture.

In an embodiment, data relationships between Smart Regions can be used in addition to regional profiles to better identify interrelationships of comparative baselines. For example, data relationships can help identify common trends between Smart Regions including the impact of subsidies and waivers on competitors or rising fuel prices.

In an embodiment, the regional monitor is configured to identify stakeholders in the Smart Region. In an embodiment, identified stakeholders can include citizens, activists, politicians, tax payers, the community, corporations, or special interest groups.

In an embodiment, the regional monitor is further configured to measure compliance. For example, with standards defined for each activity, a scoring mechanism is utilized to determine if each standard is being achieved. In an embodiment, the scoring mechanism is based upon specific interpretive benchmarks. In an embodiment, the scoring mechanism can correlate the compliance of each component with stakeholders that are engaged in operating the component.

In an embodiment, the regional monitor is further configured to comprehensively analyze data. For example, with a comprehensive set of data, correlations can be calculated to shed new perspectives on a given issue. Drawn from outside of the typical "vertical" orientation, such external data can prove critically important in ensuring that services are being delivered cost-effectively and efficiently, as well as that the services are achieving the desired outcome.

In an embodiment, a community portal provides a radical departure from the concepts of an open Internet. A hyper-localized community portal is driven by an artificial intelligence (AI) engine. For example, the community portal can include a centralized website configured to create a critical mass identity for the community. In existing solutions, too often if a user wants to learn something about a community, the information is buried behind many other websites for hotels, restaurants etc. In contrast, the information of the community in the portal is indexed to provide integrated community information access. Individual websites within the community are not affected but rather integrated. Accordingly, the portal is the dominant site that provides a more focused access to their information.

In an embodiment, a community portal includes an automated community receptionist. Because of the consolidation of websites, the ability to provide a receptionist available any time becomes feasible. And because of the AI system backing, any user can get the answers they need quickly and efficiently.

In an embodiment, a tech trek can be utilized to teach the systems and methods described herein. A tech trek also allows the community to define its own needs and access a funding set-aside.

In an embodiment, the tech trek itself is a three day conference preceded by a speaker's dinner. For example, the mornings are dedicated to addressing detailed issues for each group's special interests. The afternoons are dedicated to a directed discussion of specific topics using assigned seating to ensure integration of the group. The results of these discussions are analyzed overnight and new topic sheets prepared for the next day. The focus will be how the groups can work together to implement programs to build better communities.

Registration for a tech trek conference is unique. Participants will be asked to register in a manner similar to that required for a college degree. Various "majors" are offered complete with required courses, a numbers of "credits," and recommendations for "pick 2 of 3" offerings from another discipline. Advanced "masters" and "doctorates" can be offered with additional coursework as well.

In an embodiment, the improved Smart Region architecture can comprise an e-consensus forum that strategically engages community members to become the voice of the community through their understanding of ongoing development of the public and private sector. The e-consensus forum is designed to be anonymous, inclusive, democratic, focused, and documented.

In an embodiment, the e-consensus forum is configured to include an issues formulation forum module that examines multiple concerns and prioritizes issues that must be resolved. In an embodiment, the issue formulation forum module uses component weights and scoring to determine issue prioritization.

In an embodiment, the e-consensus forum is configured to include a policy development forum module that brings stakeholders together to develop a policy consensus around identified community issues.

In an embodiment, the e-consensus forum is configured to include a smart region operations module that facilitates development of policies and operating guidelines to establish Smart Region infrastructure.

In an embodiment, the e-consensus forum is configured to include an election forum module that collects and categorizes community interests accumulated during an election period to hold elected stakeholders accountable.

In an embodiment, the e-consensus forum is configured to include an accountability forum to organize a response to an inappropriate event or action that has not been properly addressed.

In an embodiment, an e-consensus forum can be implemented on a processor that ranks the top issues facing the topic of concern, votes on the results and then builds on the top issue to explore necessary strategies, implementation tactics and the assignment of implementation responsibilities. Further, in certain embodiments, a consensus and accountability forum can be implemented on the processor to balance public and private sectors.

In an embodiment, a device-based app supports the systems and methods described herein.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 12 is a diagram of weighting schema for elements, according to an embodiment.

FIG. 13 is a diagram of regional profile characteristics, according to an embodiment.

FIG. 18 is a chart of a relationship index for two region index structures, according to an embodiment.

Figure 1:
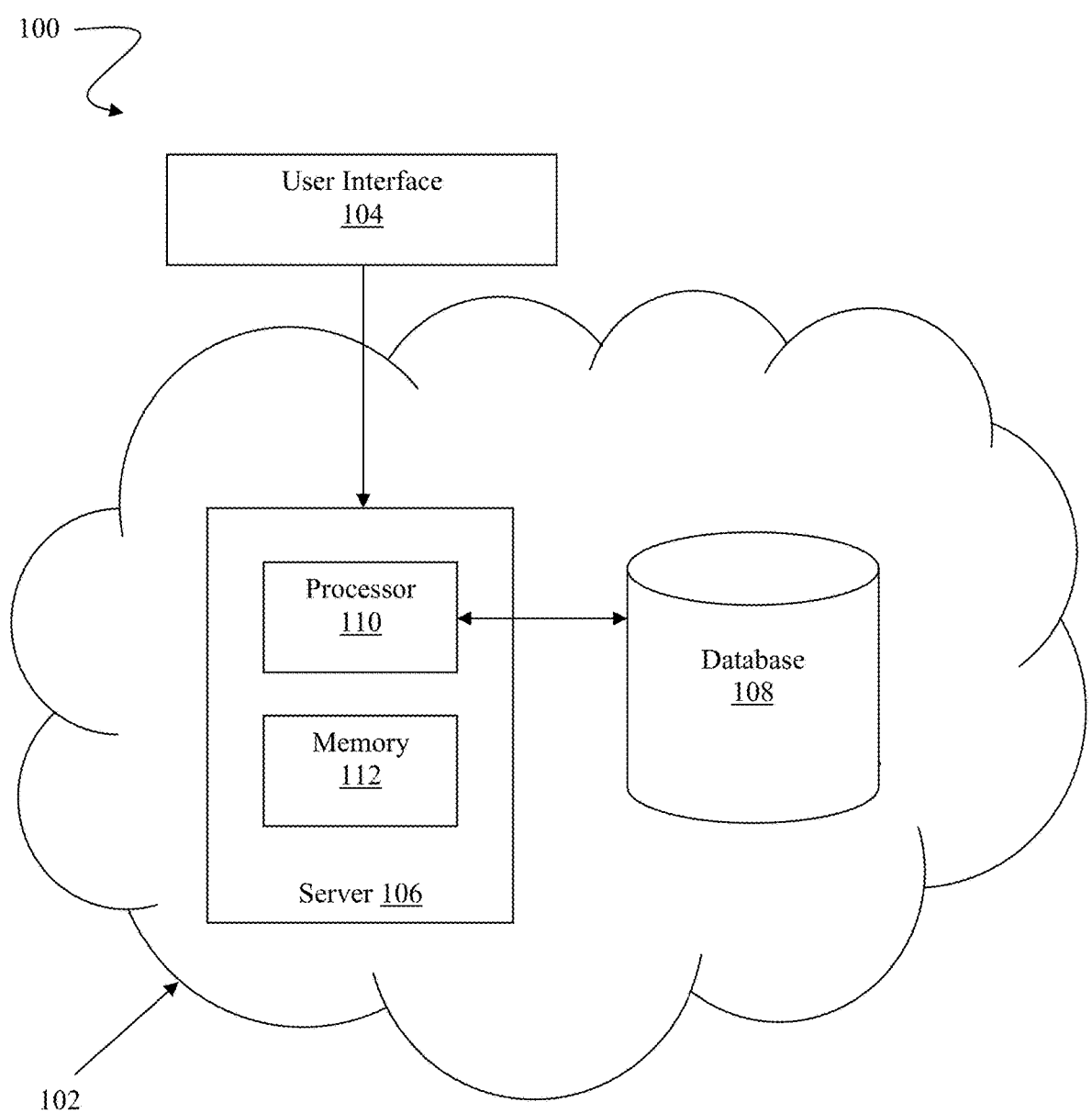
FIG. 1 is a block diagram of a system implemented by a single cloud server, according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1, a system 100 is described herein with respect to a cloud-based system, embodiments of the invention can be performed in a cloud computing, client-server, or standalone computer processing environment, or any combination thereof.

Figure 2:
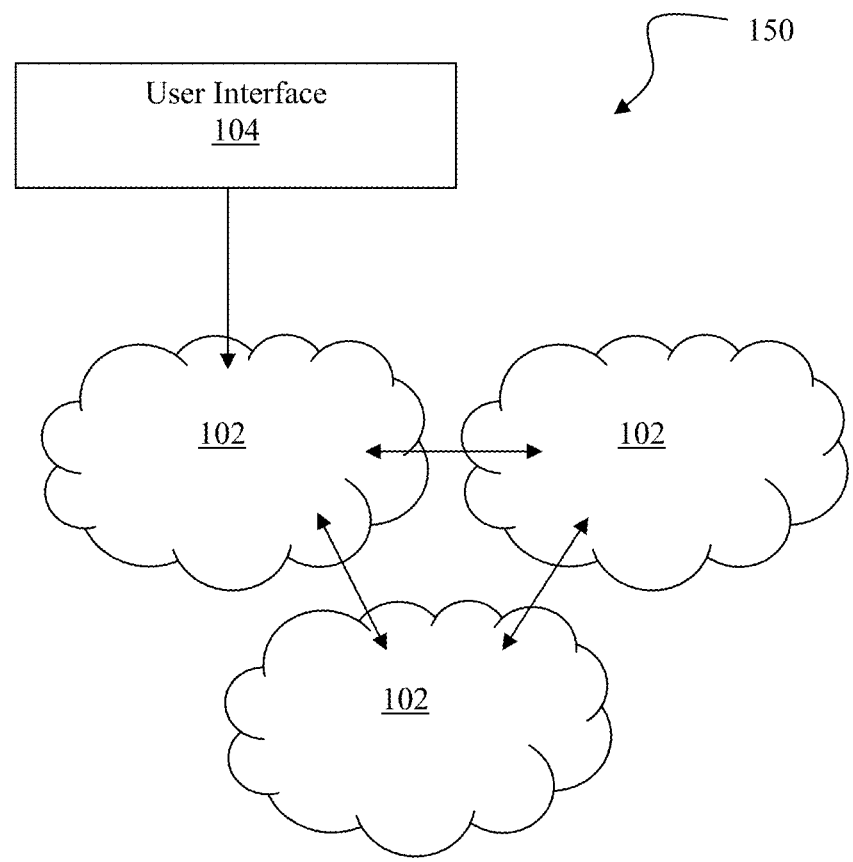
FIG. 2 is a block diagram of a system implemented by multiple cloud servers, according to an embodiment.

In an embodiment, cloud-based processing engine 102 generally includes server 106 and database 108. Cloud-based processing engine 102 embodies the computation, software, data access, and storage services that are provided to users over a network. The components of cloud-based processing engine 102 can be located in a singular "cloud" or network, or spread among many clouds or networks, as depicted in FIG. 2. End-user knowledge of the physical location and configuration of components of cloud-based processing engine 102 is not required.

Server 106 generally includes processor 110 and memory 112. Processor 110 can be any programmable device that accepts digital data as input, is configured to process the input according to instructions or algorithms, and provides results as outputs. In an embodiment, processor 110 can be a central processing unit (CPU) configured to carry out the instructions of a computer program. Processor 110 is therefore configured to perform basic arithmetical, logical, and input/output operations.

Memory 112 can comprise volatile or non-volatile memory as required by the coupled processor 110 to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

As depicted in FIG. 1, server 106 interfaces with database 108 via processor 110. Specifically, processor 110 can execute database-specific calls to store and retrieve data from database 108. Database 108 is can comprise any organized collection of data. In embodiments, database 108 can comprise simple non-volatile memory as part of a computer. In embodiments, database 108 can comprise database management systems such as Oracle, IBM DB2, or Microsoft SQL Server, for example. In embodiments, database 108 actually comprises a plurality of databases.

In an embodiment, as shown in FIG. 1, database 108 is discrete from server 106. In another embodiment, database 108 is a part of server 106. In other embodiments, referring to FIG. 2, database 108 can be accessed as part of a separate cloud-based processing engine 102. Components of cloud-based processing engine 102 can therefore be spread among multiple cloud-based processing engines. For example, and referring to system 150, server 102 can be spread among many cloud-based processing engines 102. Database 108 can reside on a first cloud-based processing engine 102, while processor 110 and memory 112 reside on a second cloud-based processing engine 102. Or, processor 110 can reside on a first cloud-based processing engine 102, memory 112 can reside on a second cloud-based processing engine 102, and database 108 can reside on a third cloud-based processing engine 102. Any number of permutations where components are spread among a plurality of clouds are considered.

Likewise, system 150 can also comprise a plurality of servers 106 and databases 108. User interface 104 can be configured to access a first cloud-based processing engine 102, and the processing, storage, and presentation of data can be configured to be spread among second and third cloud-based processing engines 102 which are coupled to the other cloud-based processing engines 102, for example. Systems 100 and 150 are depicted in FIGS. 1 and 2, respectively, for simplicity only by way of example and are not intended to limit the scope of the invention.

Figure 3:
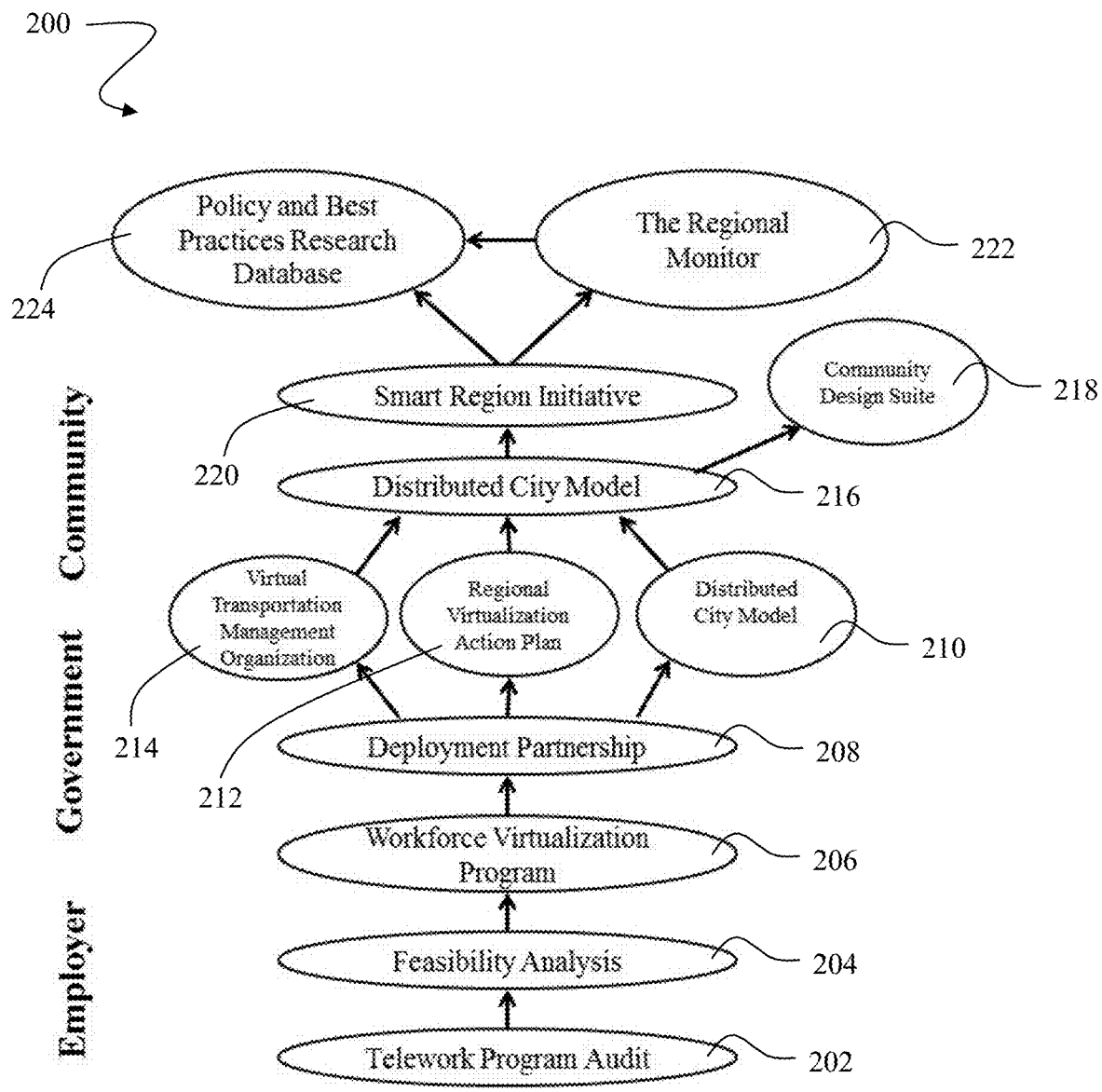
FIG. 3 is a block diagram of components of a Smart Region, according to an embodiment.

Referring to FIG. 3, a block diagram of components of a Smart Region 200 is depicted, according to an embodiment. More particularly, FIG. 3 depicts example infrastructure that can be applied to implement a Smart Region.

In an embodiment, Smart Region 200 generally comprises a telework program audit 202. In an embodiment, telework program audit 202 is configured to indicate a level of compliance of a telework implementation.

Smart Region 200 further comprises feasibility analysis 204. In an embodiment, feasibility analysis 204 is configured to output the benefits of a strategic approach for an organization's fiscal and operational position.

Smart Region 200 further comprises workforce virtualization program 206. In an embodiment, workforce virtualization program 206 is configured to optimize telework deployments, function as part of a continuity/disaster program, implement performance accountability, and facility "rightsizing." In an embodiment, telework program audit 202, feasibility analysis 204, and workforce virtualization program 206 can be employer-dependent.

Smart Region 200 further comprises deployment partnership 208. In an embodiment, deployment partnership 208 represents the validation of the telecommuting mindset in the region and embraces collaboration with the private sector in addressing all forms of telecommuting for congestion and quality of life concerns. Further, deployment partnership 208 is configured to utilize statistics to better understand industry policy and best practices, employer deployment profiles, infrastructure analysis and their impacts on all other metro systems. In an embodiment, deployment partnership 208 can be region-dependent.

Smart Region 200 further comprises distributed city model 210, regional virtualization action plan 212, and virtual transportation management organization 214.

In an embodiment, distributed city model 210 is configured with a suite of implementation tools to enhance the viability and quality of life for all communities and their residents. For example, community profiles provide access to rural communities for technology and transit and provide tools for individual rural communities to populate information on the Internet.

In an embodiment, regional virtualization action plan 212 is configured with various s to engage the community to review quality of life opportunities that telecommuting offers and to modify public and private policy in its support, and provide a multi-phased program to engage the community in a discussion about virtualization and desires to apply virtualization to eliminate the urban-rural divide.

Figure 4:
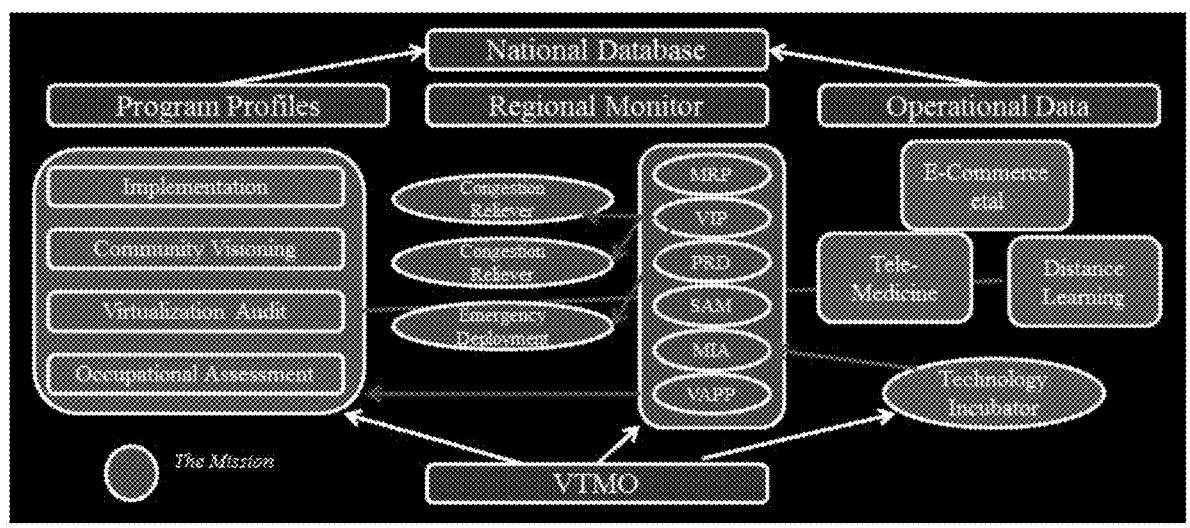
FIG. 4 is a flowchart of a regional virtualization action plan, according to an embodiment.

For example, referring to FIG. 4, a flowchart of a regional virtualization action plan 212 is depicted, according to an embodiment. Regional virtualization action plan 212 can include a four-phase program configured to gather information on the number of applications that can support the telecommuting mindset, i.e., to make everything that is available physically, available electronically, i.e., to access "anything" from "anywhere," at "anytime". In other words it seeks physical-electronic "access parity" for all services deemed necessary for the lifestyle.

In addition, four congestion techniques are deployed: (1) routine trip reduction as a result of employee deployment, (2) four-level deployment that occurs when activated by participating employer's continuity plans, (3) short term traffic diversions and increased deployments for traffic disruptions, and (4) long-term deployments during road reconstruction and other significant traffic interruptions.

In one embodiment, regional virtualization action plan 212 is performed in four consecutive Phases. First, an Occupational Assessment (Phase I) begins with a Regional Workshop to review the Assessment process with all participating agencies. The group reviews the Assessment Report and determines if there is any additional data that could be collected to better understand the telework potential of the region. In an embodiment, forty-five employers (three employers in each of the fifteen business sectors) are recruited to participate. The assessment is administered to the assigned employees that represent the designated occupations.

Once all employers have completed the Assessment the data is analyzed and extended to the regional workforce. The report is prepared, which can address trips, accidents, energy, emissions, space reduction potential, managerial understanding of telework, attitudes about a variety of topics and each employer gets their individual report along with a graph indicating their success probability and return on investment.

In Phase II, the Community Audit expands the Phase I findings by conducting a curriculum audit for participating colleges/universities. This Assessment determines the degree to which distance learning could be applied to lecture courses among others to determine its impact on trips and potential space reductions and building repurposing In Phase III, community visioning is based upon an e-consensus forum. All of the preceding data is provided to groups of community members prior to the Forum. At the forum, the group is asked to comment on the advisability of adopting the telecommuting mindset, determining what must be done to encourage and/or expand telecommuting applications. A list of these changes is drafted for implementation and the appropriate agency is identified to make the change.

In Phase IV, an implementation monitor tracks the list of implementation recommendations and supports the development and adoption of the recommended policies and standards.

In an embodiment, virtual transportation management organization 214 is configured with various s to support the region by addressing congestion, emergency management, and by extending virtual services to non-transit areas. Virtual transportation management organization 214 supports and promotes telecommuting applications and applies such applications as a comprehensive alternative to physical travel.

As depicted, distributed city model 210, regional virtualization action plan 212, and virtual transportation management organization 214 are inputs to a further distributed city model 216.

Smart Region 200 further comprises community design suite 218. In an embodiment, community design suite 218 provides a set of tools for individual communities to maximize the opportunities and benefits of its engagement in Smart Region 200.

Smart Region 200 further comprises smart region initiative 220. In an embodiment, smart region initiative 220 comprises full integration of the urban-rural divide throughout the metropolitan service area.

Figure 5:
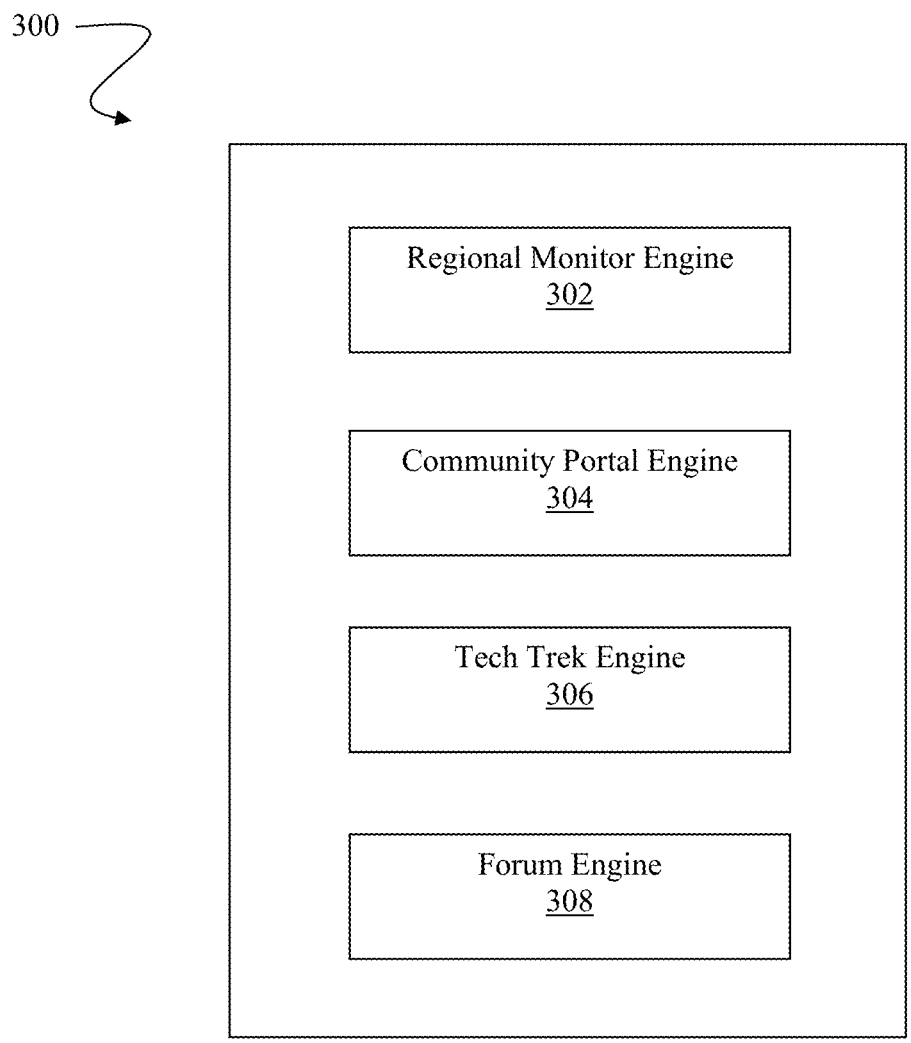
FIG. 5 is a block diagram of system engines, according to an embodiment.
Figures 6, 7:
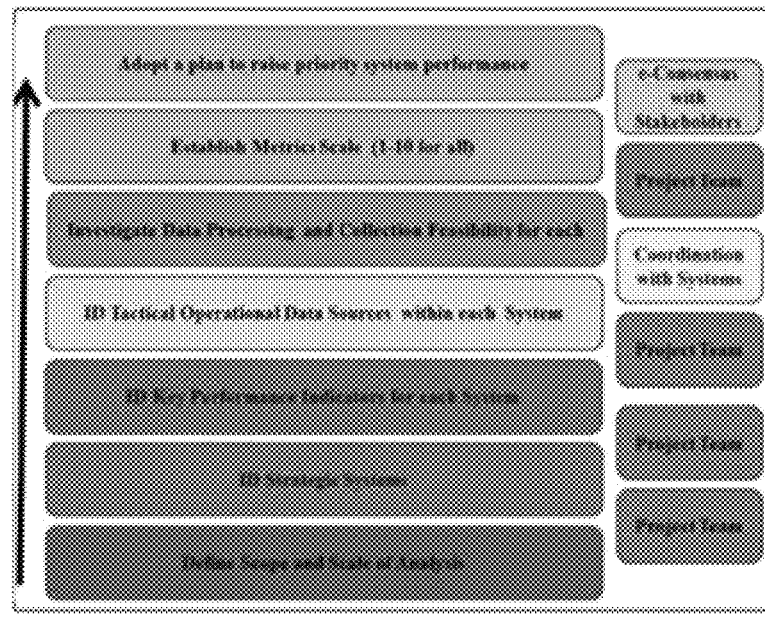
FIG. 6 is a block diagram of an index scoring method for a regional monitor engine, according to an embodiment.
FIG. 7 is an annotated image of a value evaluation method for a regional monitor engine, according to an embodiment.

In an embodiment, regional monitor 222 is described herein further with respect to FIGS. 5-7, and can be implemented in coordination with policy and best practices research database 224.

Referring to FIG. 5, a block diagram of a system 300 is depicted, according to an embodiment. In an embodiment, system 300 comprises a regional monitor engine 302, a community portal engine 304, a tech trek engine 306, and a forum engine 308.

Regional monitor engine 302 comprises a management information sub-system for a region as defined by the Distributed City Model/Smart Region. In an embodiment, the sub-system comprises three elements.

First, the sub-system comprises a profile for the region that is developed based upon a set of universal factors. This allows comparisons between comparable regions worldwide.

Second, the sub-system comprises a high-level computational process that analyzes all data fed into the sub-system to maintain monthly trend data for key indicators at three or more levels: a base level for each of the areas of raw data collection (e.g., how many riders in each of transit category); a mid-level that analyzes all transit operations to generate a transportation index, and a high level index that evaluates all sub-indices into a comprehensive view of all trends.

Third, the sub-system comprises a data collection component that focuses on data at the lowest possible level. Each index may have numerous sources of index data. For example, a cell phone app can send messages to each data source requesting the specific data for which it is responsible. Referring to FIG. 6, a block diagram of an index scoring method for regional monitor engine 302 is depicted, according to an embodiment.

Embodiments are configured to develop a 1-10 range for all scores through interpolation and define an appropriate score for each index. For example, the range of sales per capita may range from $50-$2500. Accordingly, through interpolation, 1=50 and 10=2500. The appropriate scoring process can decide that a score of 3.5 would be the optimal score (a dollar value of $857). With a standardized 1-10 format, the deviations from the optimal are easier to track.

For costs, the currency conversion rates as a separate item can be tracked. In an embodiment, all costs would be converted to dollars.

The computational process that builds the index consists of three values combined to constitute the score. In an embodiment, a definitional value is given an alpha grade based upon definitions, thereby creating consistency. In an embodiment, the definitional values ae converted to numeric values with an exaggeration of the negative. Accordingly, a really bad value massively alters the overall score (e.g. in letter grades, A=2, a B=4, a C=6 and a D=16). Finally, a community value 'weighting' differentiate items that are very important to a particular community from those that are not. For example, referring to FIG. 7, an annotated image of a value evaluation method for regional monitor engine 302 is depicted, according to an embodiment. As will be described, a further embodiment of evaluation methods are disclosed by FIG. 22 and its corresponding description.

In an embodiment, factors to be considered include physical systems factors such as geology (e.g. unique features, mineral resources, slope stability/rockfall, depth to impermeable layer, subsistence, consolidation, weathering/chemical release, and tectonic activity/volcanism); soils (e.g. slope stability, eroding characteristics, first value, and foundation support—shrink swell, frost susceptibility, surface deformation, liquefaction); special features (e.g. sanitary landfills, wetlands, central zone/shorelines, mine dumps/spoil areas, and prime agriculture area); water (e.g. hydrologic balance, ground water resources including existence of water and flow direction depth to water table, sedimentation, water quality, and drainage/storage including channel formation, impoundment leaks/slope failure, flooding); climate/air quality (e.g. macro-climate hazards, forest/range fires, heat balance, wind alteration, humidity and precipitation generation and dispersion of contaminants, shadow effects, and noise).

In an embodiment, additional factors to be considered include support systems factors such as biota (e.g. plant and animal species, vegetative community, diversity, productivity, and nutrient cycling); energy (e.g. energy requirements, conservation measures, and environmental significance); utilities (e.g. liquid water disposal, solid waste disposal, water supply, and storm water drainage); and safety and transportation (e.g. structures, materials, site hazards, circulation conflicts, road safety and design, and ionizing radiation).

In an embodiment, additional factors to be considered include community services factors (e.g. education, day care, libraries, social services, police, fire protection, commercial facilities, recreational, cultural and social services, employment, and health care hospitals—long term care, physicians, and emergency health care).

In an embodiment, additional factors to be considered include community structure factors (e.g. psych-well being, physical threat, crowding, nuisance, and symbolism); aesthetic quality (e.g. visual content, area and structure coherence, and apparent access); sense of community (e.g. community and organizations, homogeneity and diversity, and community stability and physical characteristics); historic values (e.g. historic structures, and archeological sites and structures); and physio well-being (e.g noise, vibrations, odor, light, temperature, and disease).

In an embodiment, additional factors to be considered include community fiscal factors (e.g. budgetary accountability, donation tracking, institutional funding, oversight and analysis tools, tax rates, levies, equitability in financing).

Referring again to FIG. 5, community portal engine 304 generally comprises a web server with a user interface display for a community with particular capabilities. For example, user interface 104 can be utilized to access content on the web server. The community portal engine 304 solves the problem of localized Internet search. In traditional methods, if a user searches for a particular city, the web delivers hotel, restaurant and other sites, but finding the "community" is a challenge.

Figure 8:
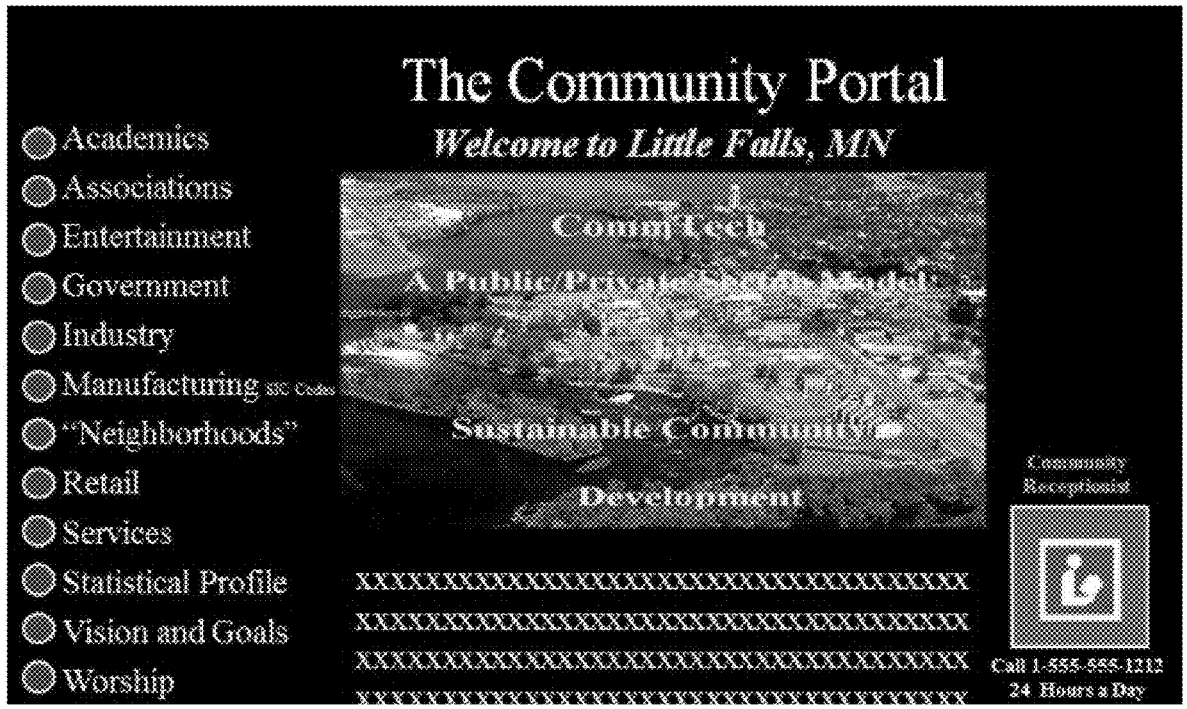
FIG. 8 is an example of a screenshot of a community portal engine display, according to an embodiment.

The web server is configured to create a central website for the community with specific capabilities. For example, referring to FIG. 8, a screenshot of an example community portal engine display is depicted, according to an embodiment. In an embodiment, a 24×7×365 receptionist is available to users to automatically respond to user questions. In an embodiment, an index structure provides data from multiple sources to centralize such data in a single location. In an embodiment, an AI system helps users find exactly what they want. In an embodiment, an interface for trade center neighborhoods or lifestyle neighborhoods can be presented.

Referring again to FIG. 5, tech trek engine 306 is configured to organize a plurality of events and attendees in a data structure. For example, user interface 104 can be utilized to access content or provide content to tech trek engine 306.

In an embodiment, data collected and subsequently presented in an organized format to a user can include community development data, such as economic development, chambers of commerce, planners, locally elected officials, etc.; strategic policy data such as national leaders in policy development roles, roles of government, corporations, education etc. in developing and implementing cohesive policy responses for building better communities; telecommunications data such as communications and computer companies; trip technologies data such as the entre-preneurial fringe who are exploring trip replacement products and services; and work relationships data.

Referring again to FIG. 5, forum engine 306 is configured to store and rank various data. For example, an e-consensus forum tool can be implemented such that participants are random representatives of a consensus and accountability forum (as will be described). Pre-registration requires a completed and verifiable profile so that when the forum's final report is released, forum engine 306 can determine what biases might be inherent in the group.

Using AI and machine learning, forum engine 306 can utilize data sets that keep attributes anonymous, because the input is done through computer interfaces, participants can express their true beliefs rather than having to publicly maintain a "party line." In an embodiment, attributes are inclusive given various timeframes open for respondents to participate. In an embodiment, attributes are democratic such that each participant has one vote. Accordingly, rather than having an in-person meeting dominated by the most vocal or powerful individuals, ideas are all anonymous and therefore the participants vote on the value of the ideas, not the strength of the personalities. In an embodiment, attributes are focused such that the process groups all the input into "vote-able" items so that the group or forum engine 306 can identify what is most important and leave the lesser issues for a later forum if desired. In an embodiment, once a vote is taken, the process moves forward. In an embodiment, attributes are recorded such that every word and every vote is anonymously captured for later review and analysis.

In an embodiment, forum engine 306 provides sequential exploration of a topic in which the s alternate between an open-ended discussion about strategies, tactics, and responsibilities followed by a vote after each. In an embodiment, only the top issue is moved to the next level.

In an embodiment, a consensus and accountability forum uses the e-consensus forum tool to re-establish the community's role as the fulcrum in keeping the public and private sectors in balance. An e-consensus session is initiated automatically or by a user whenever a significant issue develops. Participants are self-selected, but multiple sessions may be conducted when appropriate. The pre-registration profile is important to illustrate the contributors to these recommendations. The issues are analyzed and the recommendations documented and forwarded to the media and the politicians. In an embodiment, all of the issues are reviewed and a political profile is developed showing which legislators voted with the recommendations. For major offices, another forum can be conducted to discuss the voting record compared to various candidates' records.

In an embodiment, a mobile device-based app can implement the various functionality described herein. For example, system 300 can be made available on the app by user interface 104, referring to FIGS. 1, 2, and 5.

In an embodiment, during app setup, participants are presented interfaces to complete a profile of their interests, etc. In embodiments, each forum comprises its own profile. Participants then register for a particular forum (link to personal and forum profiles) to create a roster and then a number of canned reports to determine internal biases (e.g. age, place of residence, industry, political party, etc.)

In operation, interfaces present an opening question posted to all participants (either at a single location or off-site where the user is located). Participant users can enter their response without character or input limits. Embodiments are configured to project all of responses through networked interfaces, a video projector or print the results. A user can then review all responses. Embodiments are further configured to generate a list of the ideas presented in the first responses and present the ideas into a voting format. Next, the voting format presentation is presented to all participants with a variety of voting options. In one embodiment, an individual rating system for each option on a 10-point scale is used. Upon receiving voting results, statistical analysis is conducted. In an embodiment, result images are generated and subsequently returned to the users for review. In embodiments, the aforementioned cycle is repeated with a new question being posted to everyone based upon the voting results.

Figure 9:
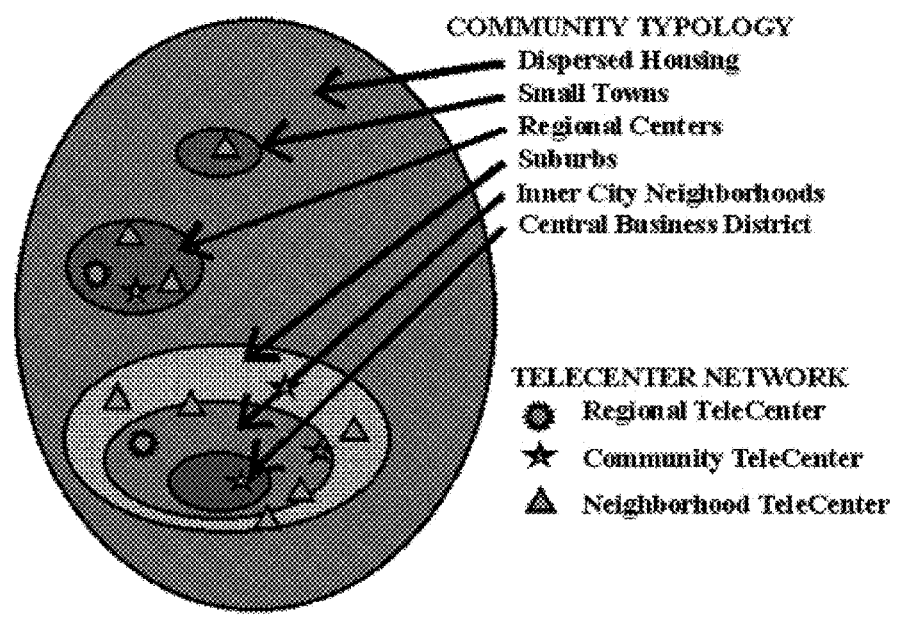
FIG. 9 is diagram of a telecenter network, according to an embodiment.

In an embodiment, an improved Smart Region architecture is configured to dynamically determine the boundaries of a Smart Region based on the social-cultural-economic orientation to a Smart City and a distributed city model. A distributed city model is a representation of a number of community types in a distributive hierarchy. In an embodiment, a distributed city model can include a representation of six community types, such as dispersed housing, small towns, regional centers, suburbs, inner city neighborhoods, and central business districts as shown in FIG. 9. Incorporating community types in a distributed city model based on social-cultural-economic orientation better classifies attributes of each community within the Smart Region and allows for increased accuracy when defining regional boundaries.

Referring again to FIG. 9, in an embodiment, the improved Smart Region architecture comprises telecenter networks to assist in connecting and educating members of a community. Telecenter networks support the technological and social interconnections underpinning economic integration within a community by providing comprehensive access to information on both the public and private sectors. In some embodiments, telecenter networks can be specific to regions, communities, or neighborhoods.

Figure 10:
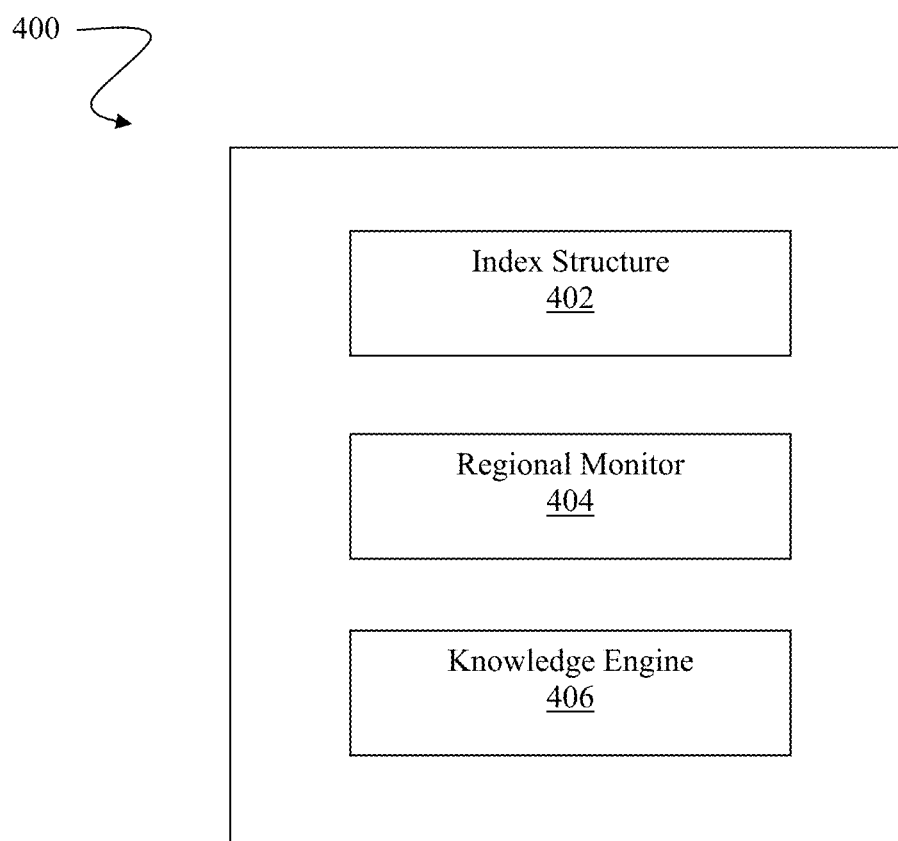
FIG. 10 is a block diagram of a Smart Regionsystem, according to an embodiment.

Referring to FIG. 10, a block diagram of an improved Smart Region architecture is depicted, according to an embodiment. In an embodiment, the improved Smart Region architecture comprises an index structure 402, a regional monitor 404, and a knowledge engine 406.

Figure 11:
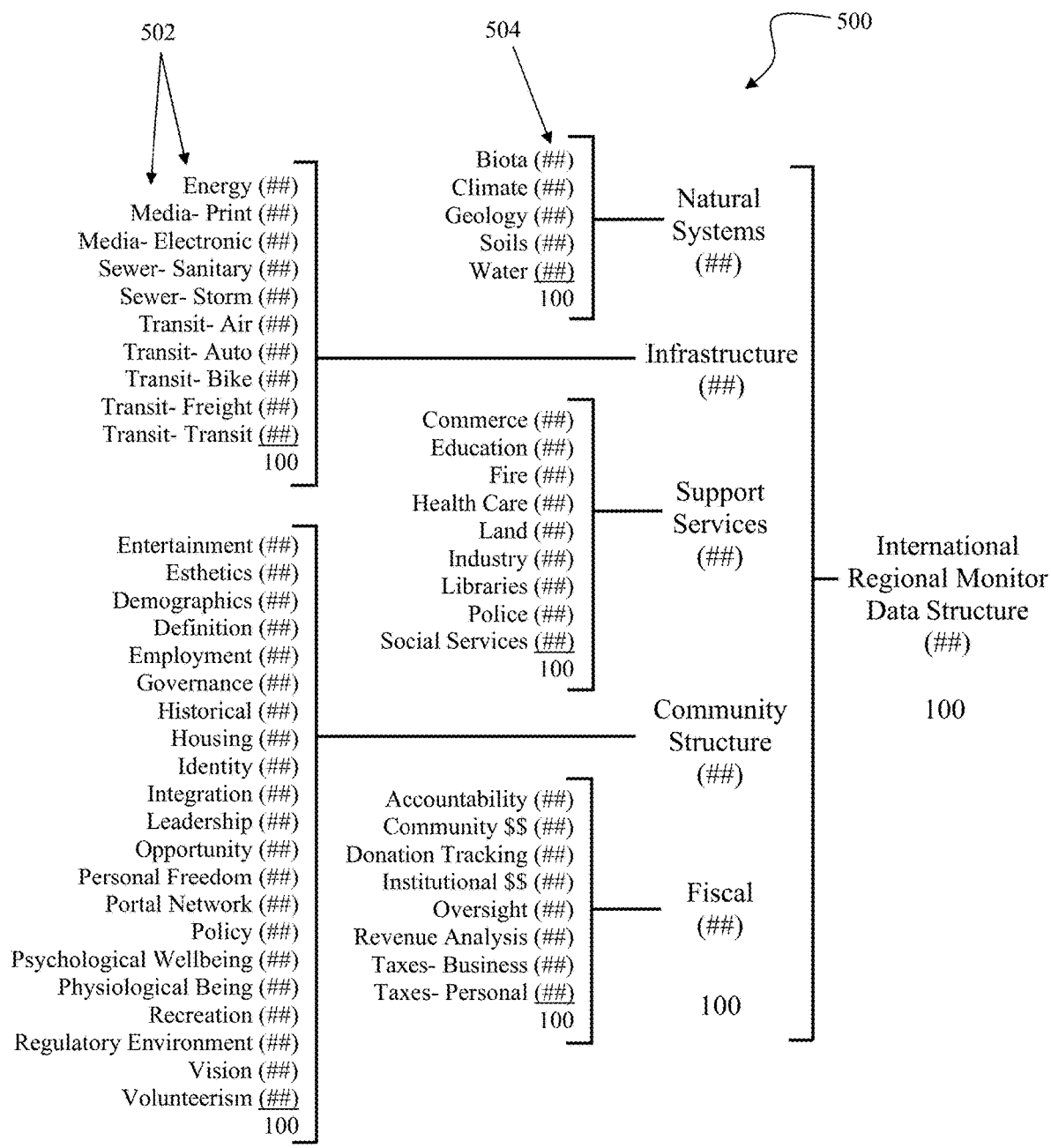
FIG. 11 is a diagram of an index structure, according to an embodiment.

Index structure 402 is configured to comprehensively index components by various levels of detail. In an embodiment, index structure 402 is configured to store weights of each component relative to other components within the assigned level of detail. In such an embodiment, the weights of each component effectively balance relevance and significance in order to generate an accurate perspective on the overall quality of region health. In an embodiment, sub-components can comprise components. In an embodiment, weights can be scaled such that all sub-components within a component total a value of 100 when aggregated. Referring to FIG. 11, a diagram of an index structure 500 comprising components 502 and weights 504 is depicted.

In an embodiment, index structure 402 further includes or identifies a plurality of stakeholder groups. In such an embodiment, stakeholder groups can include citizens, activists, politicians, taxpayers, special interest groups, community organizations, and corporations. In an embodiment, index structure 402 establishes correlations between components and relevant stakeholders who are engaged in maintaining the components. Therefore, it is possible to determine if critical assets are being supported properly by each shareholder or if a particular shareholder is failing to maintain certain component data.

Figures 14, 15:
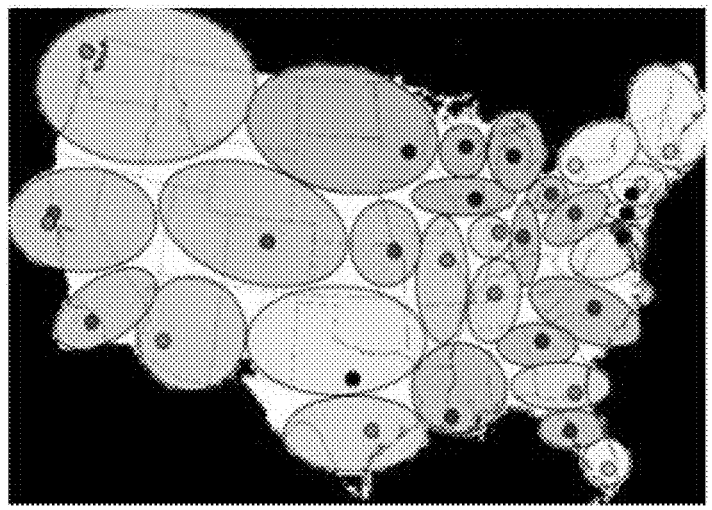
FIG. 14 is a map of potential Smart Regions across the United States, according to an embodiment.
FIG. 15 is a diagram of scoring interpretation for grading, according to an embodiment.

In an embodiment, index structure 402 is further configured to index a variety of elements for each component. In an embodiment, each element can have a set of specific objective criteria that is used to determine the relevance of the element to the overall component. In such an embodiment, each element can have a specific weight corresponding to the relevance of the element. Furthermore, each element can have an extensive profile record of sub-elements, as shown in FIG. 12. In an embodiment, weights can be scaled such that all sub-elements within an element total a value of 100 when aggregated. For each element there is an extensive profile record of unit costs, goals, and other metrics to allow for status monitoring. Determinations of how each element of a component is functioning is a baseline for the index scoring structure. Regional monitor 404 comprises a regional profiling module and a data collection coordination module. In an embodiment, the regional profiling module is configured to implement geopolitical regional profiles developed for each participating Smart Region to ensure accurate comparisons between Smart Regions. The regional profiling module additionally serves to identify key differentiating elements to distinguish the effects of profile differences from operating and policy differences. In an embodiment, geographic, social, and economic characteristics can be recorded under each regional profile, as shown in FIG. 13. In such an embodiment, characteristics of regional profiles can include population, ethnicity, demographics, eco-system, origin, employment base, fiscal stability, government, and per capita statistics. In an embodiment, regional monitor 404 can capture and process raw data from each Smart Region to allow for interactive and comprehensive analysis of at least one component based on the regional profiling. In an embodiment, regional profiling can allow for performance comparisons among participating regions regardless of location. Referring to FIG. 14, a map of some exemplary Smart Regions that may have performances compared is depicted.

Figure 18:
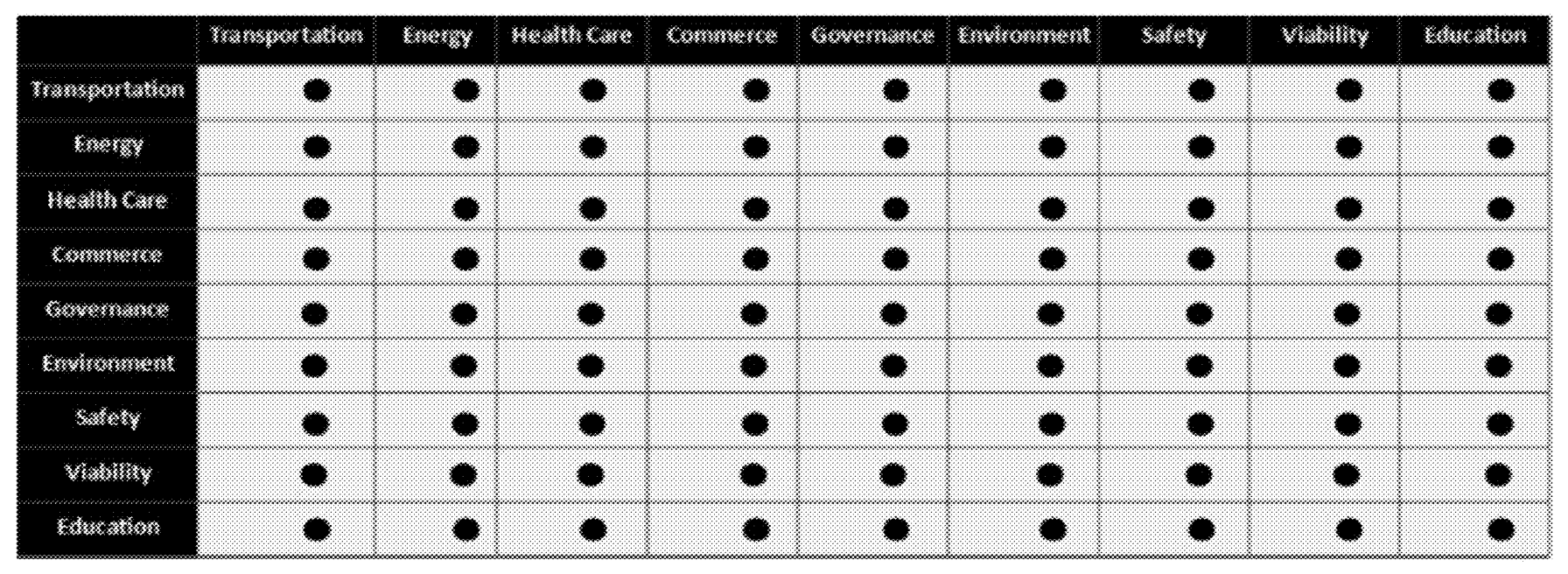

Referring to FIG. 18, a chart of a relationship index for two region index structures is depicted. Comparing two Smart Regions with similar comparative baselines can help identify interrelationships. Interrelationships that may affect multiple Smart Regions include an increase in the cost of fuel, subsidies for certain products, and natural disasters.

Referring again to FIG. 10, knowledge engine 406 is configured to maintain the integrity of the data and data structures, automatically perform all of the calculations that update the scoring process, extend the results of each element's changes throughout the system, and recalculate scores for components and regional profiles within index structure 402. In an embodiment, knowledge engine 406 categorizes components into levels. For example, knowledge engine 406 can categorize how many riders use each type of transit as a base level index, categorize all transit operations as transportation at a mid-level index, and categorize all sub-indices into a comprehensive view of all categories at a high level index.

Figure 19:
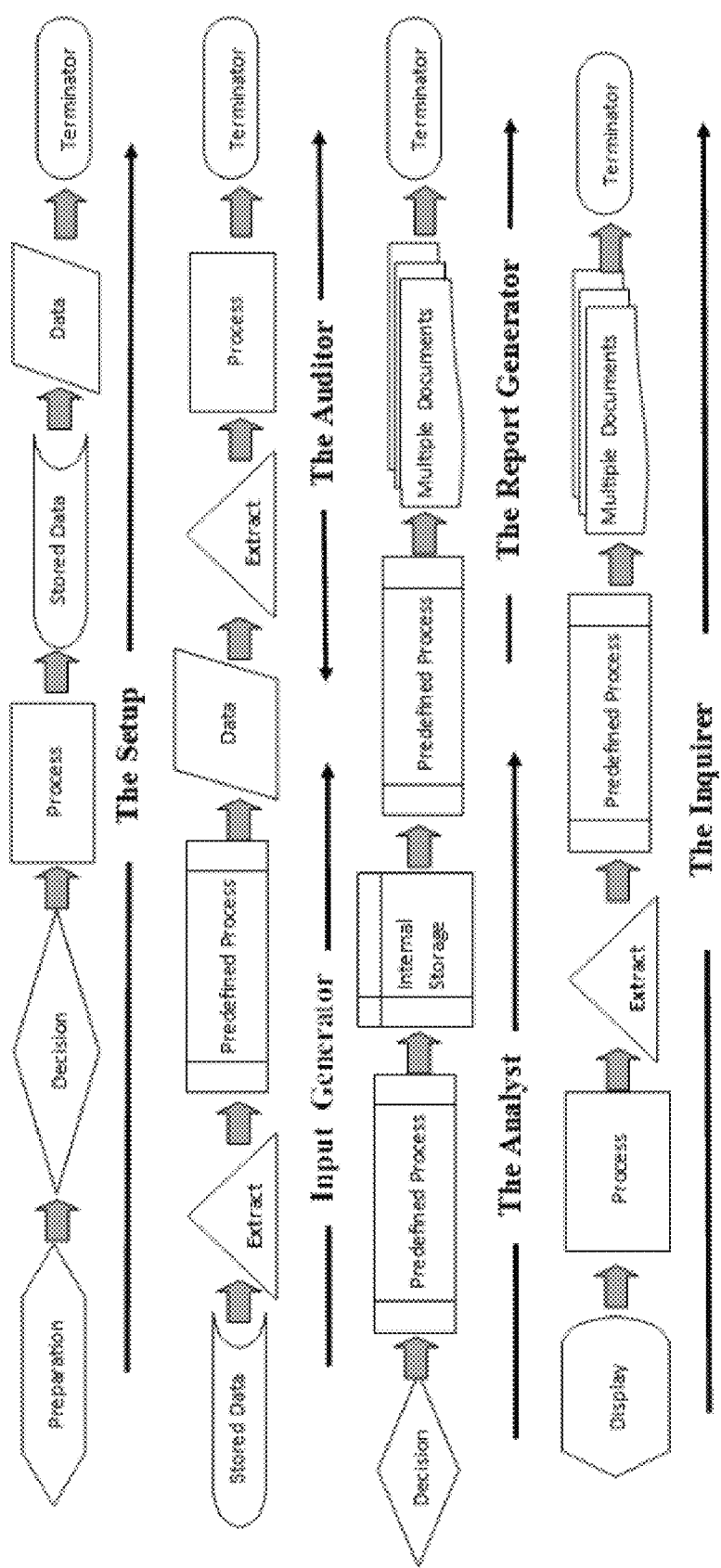
FIG. 19 is a flowchart of a knowledge engine, according to an embodiment.

Referring to FIG. 19, a flowchart of a generalized overview of knowledge engine components is depicted.

In an embodiment, knowledge engine 406 comprises an input generator module to maintain the currency of the data. In an embodiment, the input generator module can update data at different frequencies on a time-based sequence or based on event occurrence. In an embodiment, change logs for historical tracking are maintained for each element and component. In an embodiment, a contact person or preliminary contact module is responsible for the updating of the grade assigned to each element. In an embodiment, a contact supervisor or supervisory contact module is responsible for changes to stakeholders identification and other components.

Figure 20:
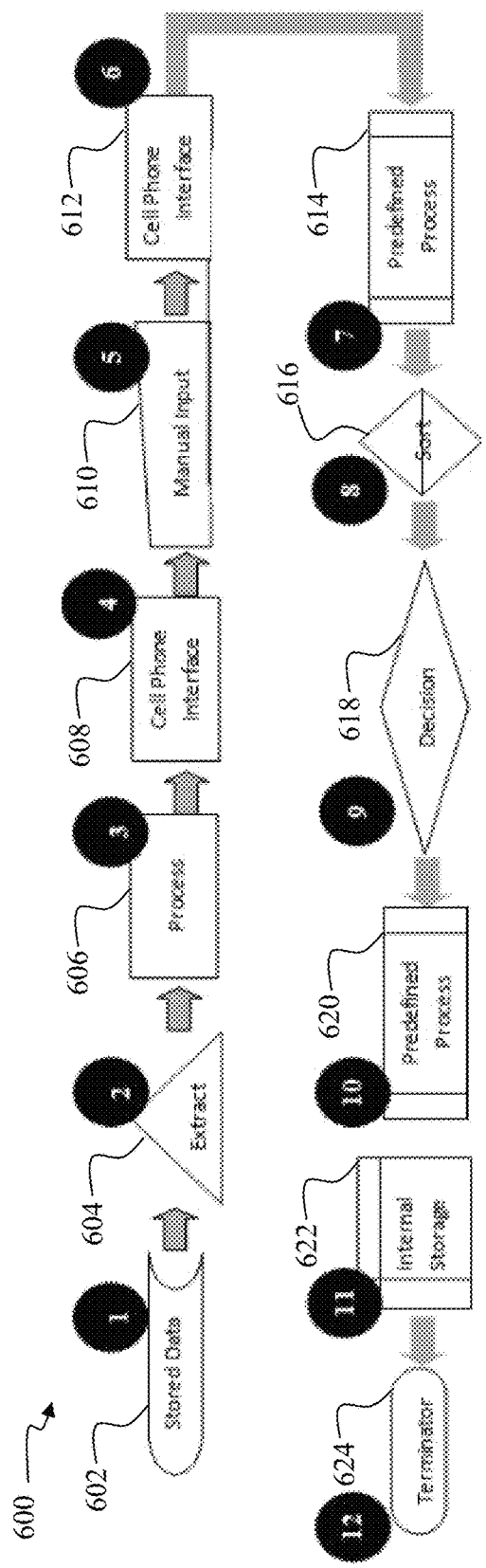
FIG. 20 is a flowchart of an input generator module, according to an embodiment.

Referring to FIG. 20, a flowchart of an input generator module process 600 is depicted. At stored data 602, the database is opened. At extract 604, the element tables are scanned to determine which need to be updated based on their linked criteria sets. At process 606, a formatted, editable grading interpretation form for each element is compiled. The grading interpretation form includes the current score, the grading interpretation descriptions and a field for updating. In an embodiment, any comments filed would also be incorporated into the grading interpretation form. At cell phone interface 608, the grading interpretation form is sent via a cell phone interface to each contact person for review. At manual input 610, the contact person completes their review and updates the grade or indicates no change. At cell phone interface 612, the updated grading interpretation form is then returned via the cell phone interface. At predefined process 614, a scanning process monitors the returning data records and continues to re-transmit them until the sent grading interpretation forms are returned. At sort 616, a secondary process aggregates the returned grading interpretation forms and sends the returned grading interpretation forms to the contract supervisor via the cell phone interface. In an embodiment, the contact supervisor is responsible for signing off on the accuracy of the grading interpretation forms, enhancing the ongoing integrity of the system. At decision 618, the input generator module process for elements is complete and notifications for any necessary follow-up are sent. At predefined process 620, system managers direct the database operators to introduce the updates into the system. At internal storage 622, the posting process updates all elements and sets any flags for further processing. At terminator 624, the database is updated and secured or backed up.

In an embodiment, knowledge engine 406 comprises an auditor module to verify the updated data. The auditor module can be responsible for updating scoring interpretations, contact information, changes to stakeholder profiles, and changes to regional profiles. In an embodiment, the auditor module is configured to periodically analyze input data for new elements and components within index structure 402.

Figure 21:
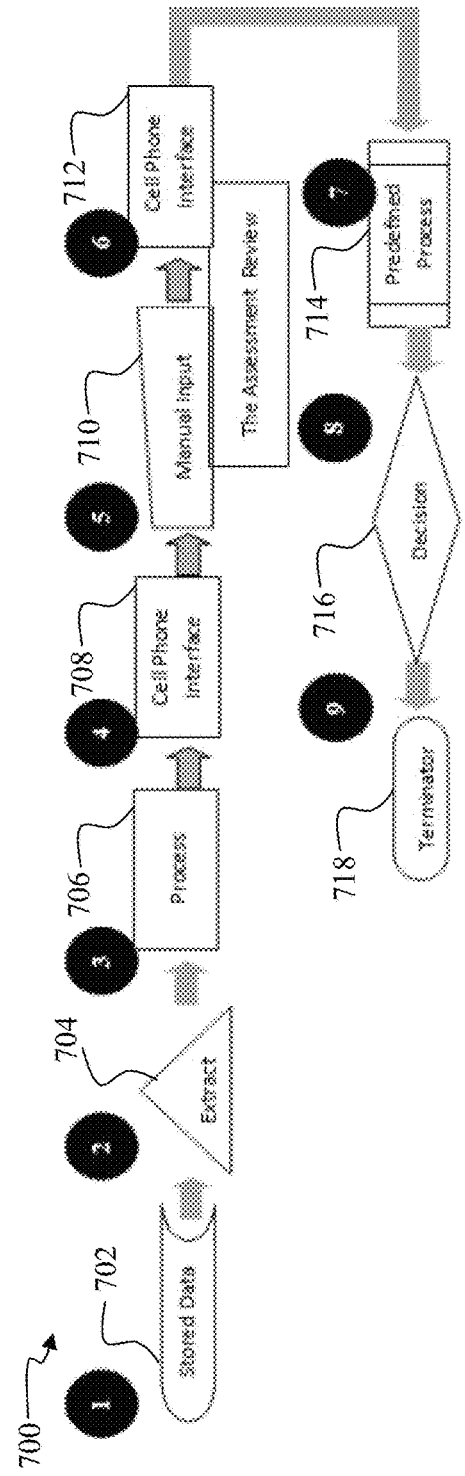
FIG. 21 is a flowchart of an auditor module, according to an embodiment.

Referring to FIG. 21, a flowchart of an auditor module process 700 is depicted. At stored data 702, the database is opened. At extract 704, the auditor module accesses the input records. At process 706, the input module sorts the input records by contact supervisor or supervisory contact module and prepares an input review form containing old and updated values. At cell phone interface 708 the auditor module transmits the input review form to all appropriate supervisors via the cell phone interface. At manual input 710, contact supervisors update element values and overall records. At cell phone interface 712, the input review form is returned to the auditor module. At predefined process 714, the input data is incorporated into the updating system by the auditor module. At decision 716 the updates are sent to an analysis module. At terminator 718, the auditor module process 700 is ended.

Figure 22:
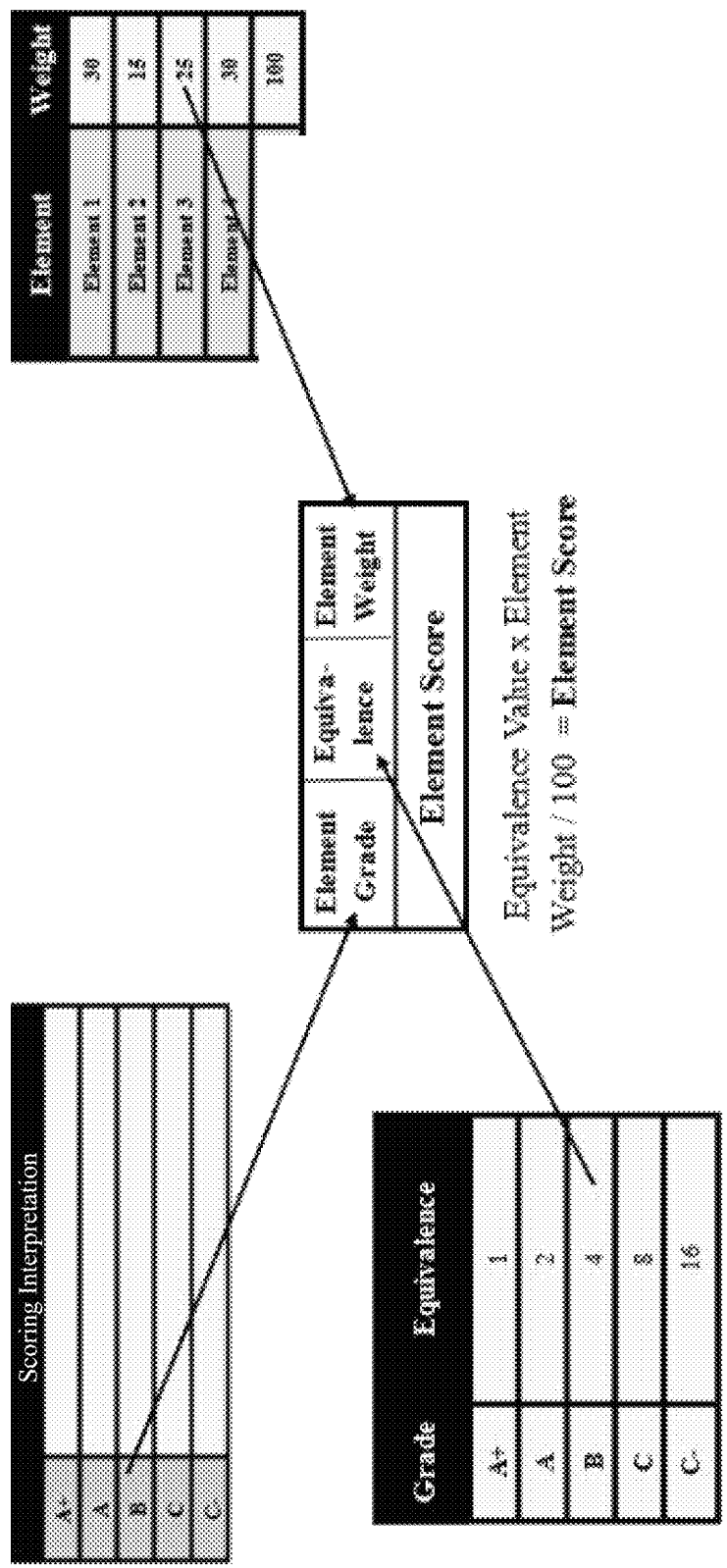
FIG. 22 is a diagram of an assessment review process, according to an embodiment.

In an embodiment, knowledge engine 406 comprises an analysis module configured to sequence execution of interactive processing to ensure consistent, accurate scoring outcomes. In an embodiment, the analysis module updates the evaluation input, and other sources where applicable, applies the weights, verifies the numeric equivalency values, and calculates the score for each element, as depicted in FIG. 22. Once updated, the analysis module then updates any data relationship changes, stakeholder alert changes, or other changes based on the input. In an embodiment, the analysis module generates trends, histories, tracking, and forecasting reports.

Figure 23:
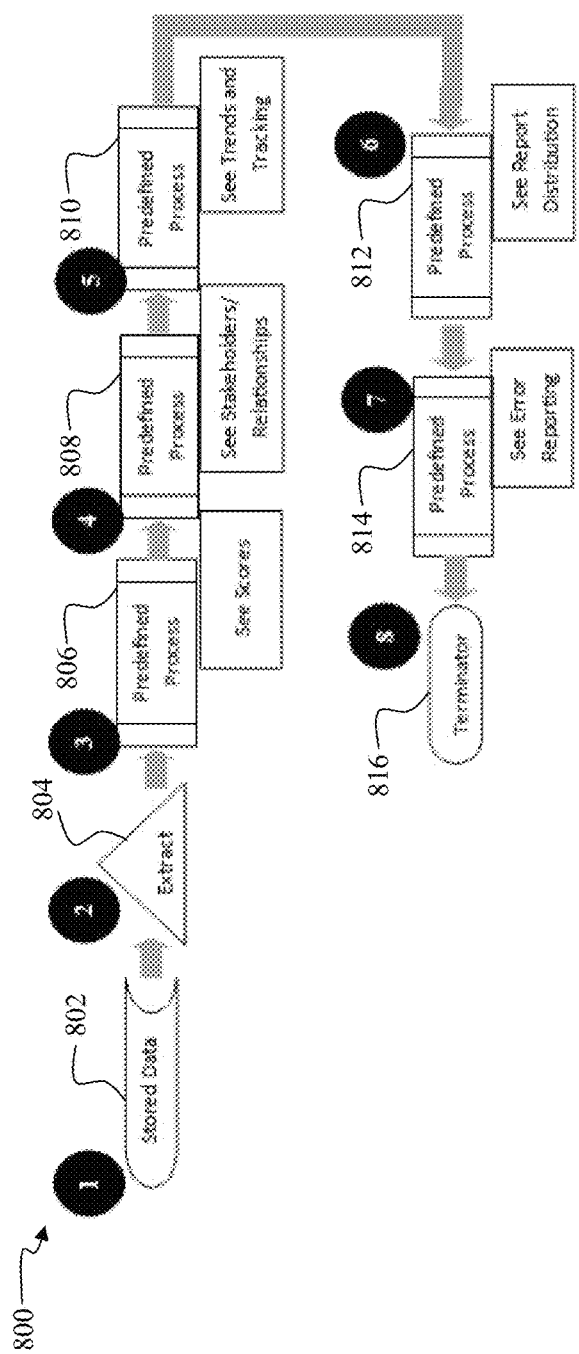
FIG. 23 is a flowchart of an analysis module, according to an embodiment.

Referring to FIG. 23, an analysis module process 800 is depicted. At stored data 802, the database is opened. At extract 804, the analysis module searches for all changes in the elements record. At predefined process 806, the analysis module updates all element scores and extends those changes through the components. At predefined process 808, the analysis module reviews all score changes and recalibrates the stakeholder and data relationship impact tables. At predefined process 810, the analysis module computes and populates the trends, histories, tracking, and forecast tables. At predefined process 812, the analysis module generates reports for stakeholders and other recipients. At predefined 814, the analysis module generates any error reports. At terminator 816, the analysis module process 800 is terminated.

Figures 16, 17:
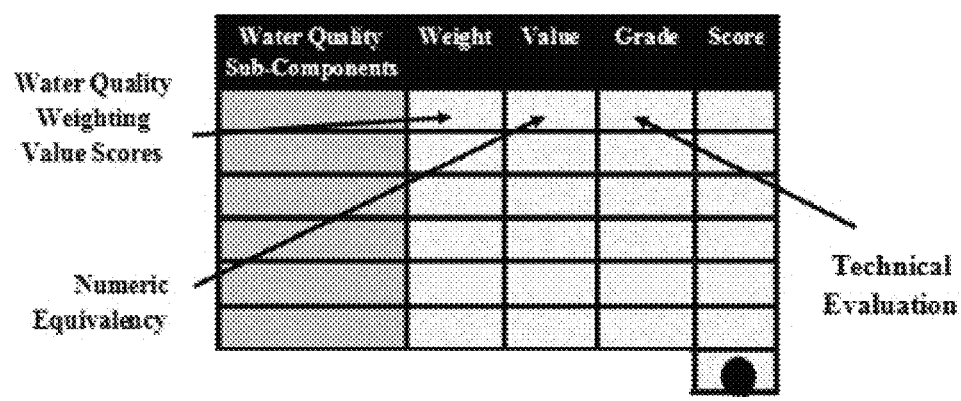
FIG. 16 is a diagram of numerical grade equivalence, according to an embodiment.
FIG. 17 is a diagram of scoring a component, according to an embodiment.

In an embodiment, the analysis module is configured to calculate an evaluation grade for each component, as depicted in FIG. 15. In an embodiment, the evaluation grades can be based upon an A, B, C classification system. In an embodiment, the evaluation grade can be converted into a numerically equivalent evaluation score using an exponential structure, as shown in FIG. 16. The evaluation score can be an exponential value to highlight problematic components. In an embodiment, the evaluation score can be based on at least one of the weights of each component in the index structure or the numerical equivalent of the evaluation grade. Referring to FIG. 17, a diagram of a sample scoring table for a component is depicted. In an embodiment, the elements relevant to each component are considered when calculating an evaluation score. In an embodiment, a predefined set of assessment interpretations are defined by the grading system.

Figure 24:
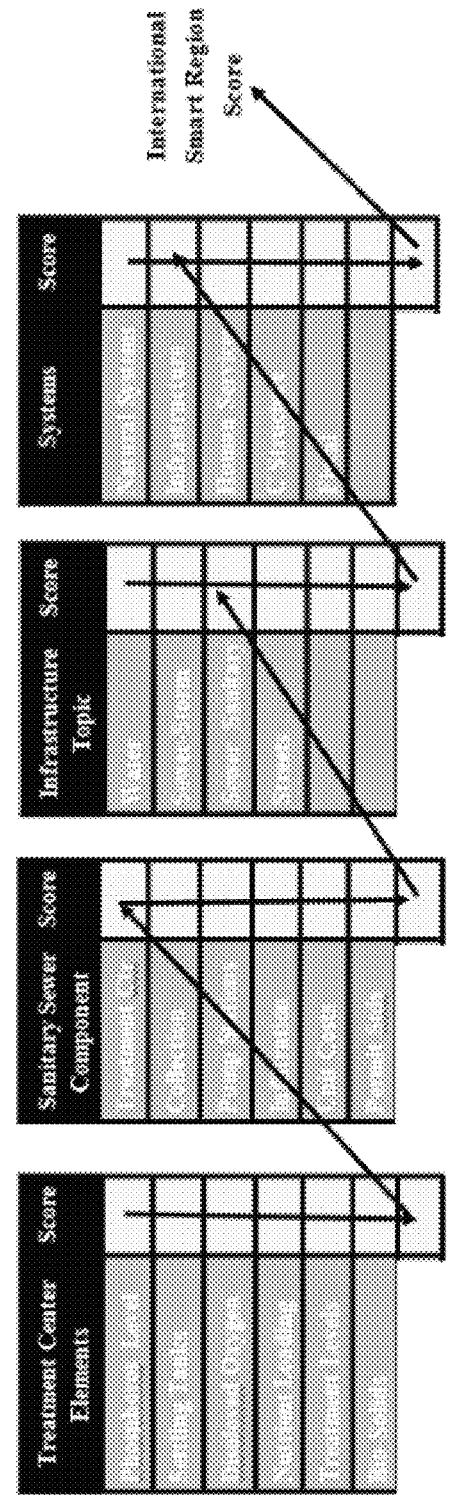
FIG. 24 is a diagram of a scoring update process, according to an embodiment.

Referring to FIG. 24, a diagram of the analysis module scoring multiple levels of elements is depicted. The evaluation of each element applies the grades, numeric equivalence, and weighting from sub-elements to calculate the element score.

In an embodiment, a relationship update process handles the scoring and relationship changes that result each time an element is changed. A change in an element's score can trigger cascading effects as components, stakeholders, and relationships that depend on the element would have to be updated as well.

Figure 25:
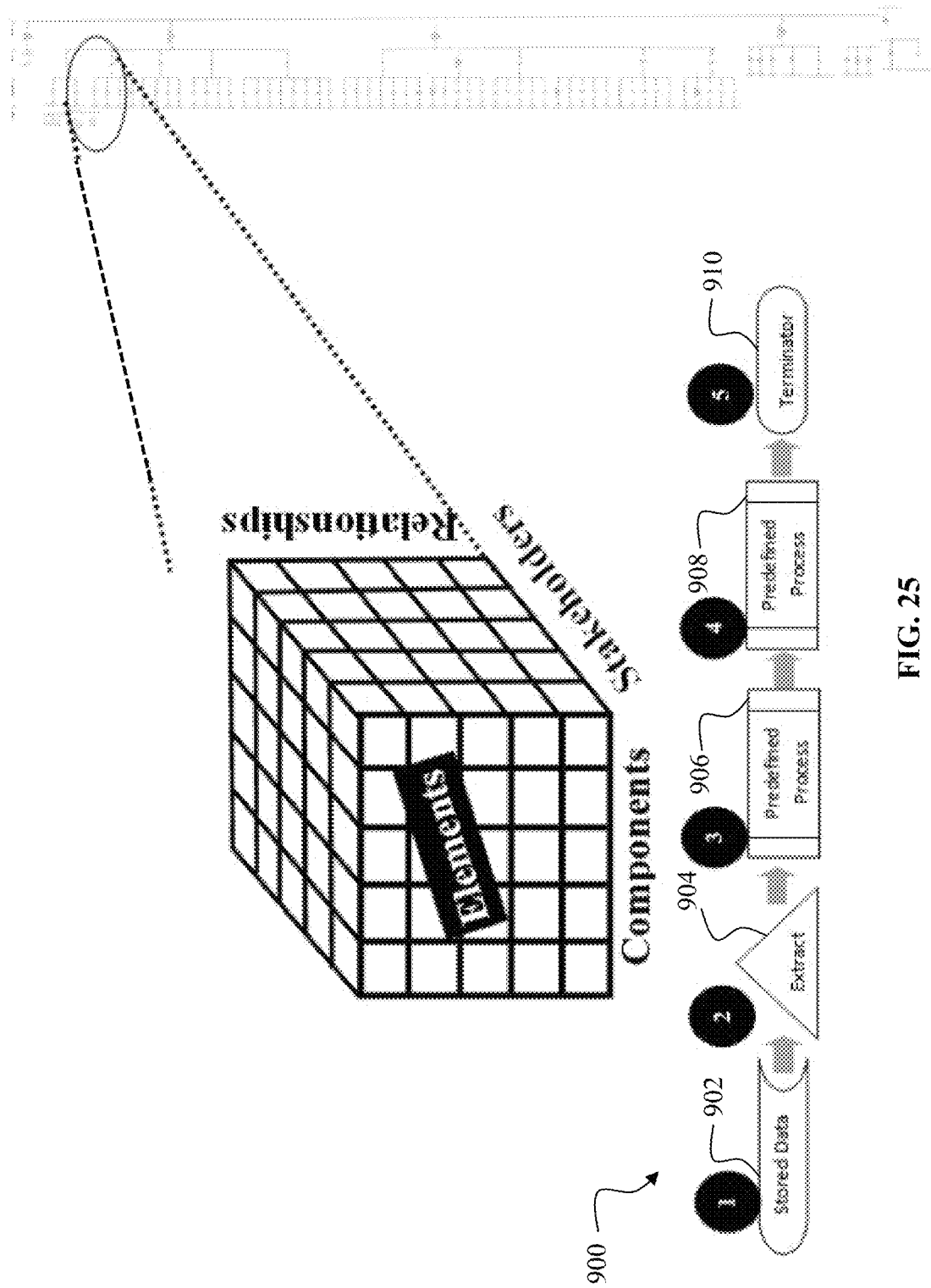
FIG. 25 is a diagram and flow chart of a relationship update process, according to an embodiment.

Referring to FIG. 25, a diagram and flowchart of a relationship update process 900 is depicted. At stored data 902, the analysis module opens the database. At extract 904, the analysis module identifies all elements that have been updated. At predefined process 906, for each element the analysis module creates a multi-dimensional array correlating the components, stakeholders and relationships. At predefined process 908, the analysis module updates the scoring calculations from the lowest level of components to the highest level of components and the index score. At predefined process 910, the analysis module terminates relationship update process 900.

Figure 26:
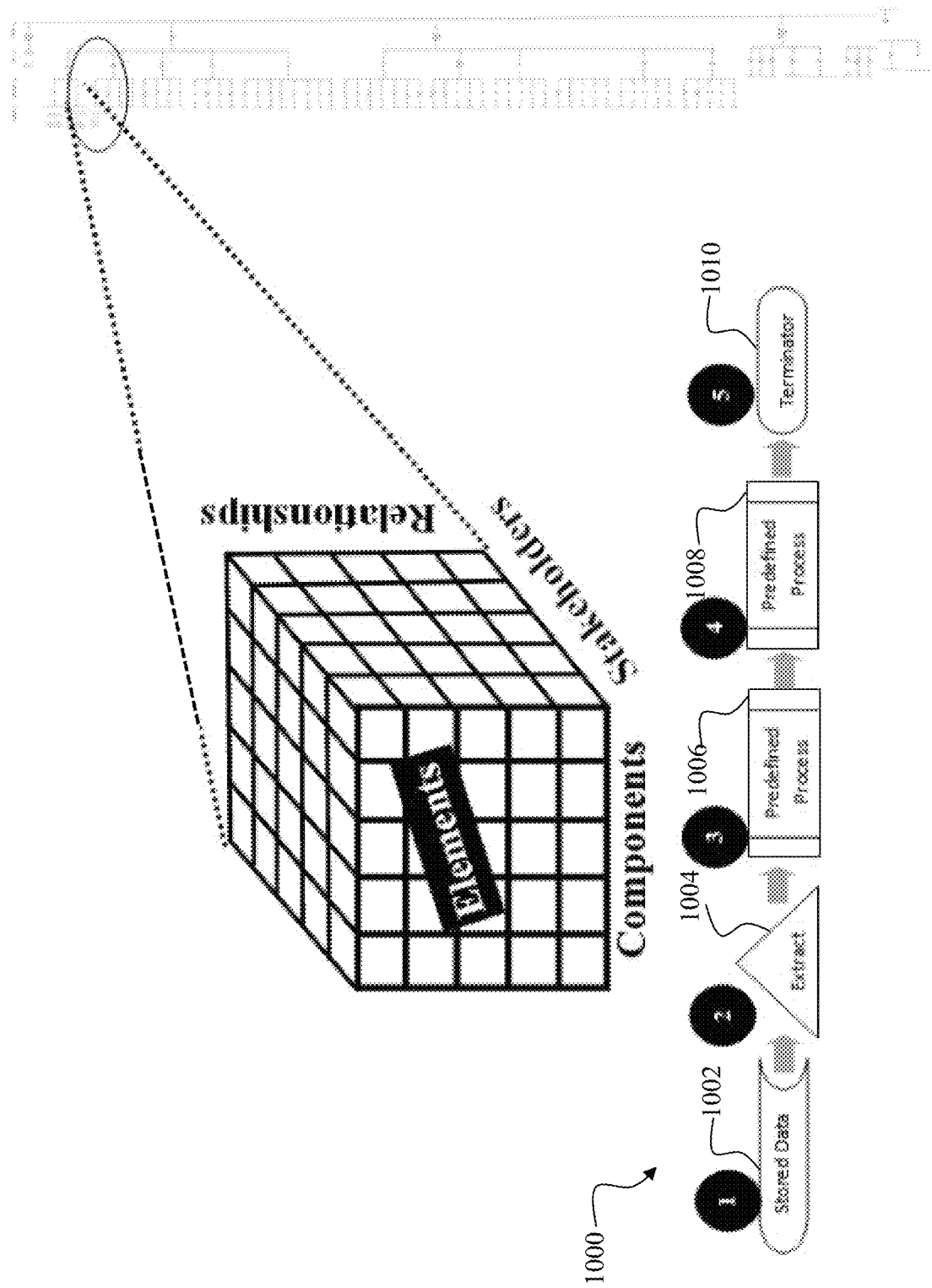
FIG. 26 is a diagram and flowchart of a stakeholder relationship update process, according to an embodiment.

In an embodiment, upon completion of the updating process, the trends and tracking generation process begins. Key reports are generated within the system for each updating cycle. Overtime, it is important to be able to examine those changes within the context of policy and time. The trends and tracking generation process writes selective report formats into archival records to preserve the timeline Referring to FIG. 26, a diagram and flowchart of a stakeholder relationship update process 1000 is depicted, according to an embodiment. In an embodiment, relationship update process 900 and stakeholder relationship update process 1000 can be implemented simultaneously, concurrently or sequentially, as the two processes can include identical actions (except for the fields being modified). In particular, at stored data 1002, the analysis module opens the database. At extract 1004, the analysis module identifies all elements that have been updated. At predefined process 1006, for each element the analysis module creates a multi-dimensional array correlating the components, stakeholders and relationships. At predefined process 1008, the analysis module updates the scoring calculations from the lowest level of components to the highest level of components and the index score. At predefined process 1010, the analysis module terminates relationship update process 1000.

Figure 27:
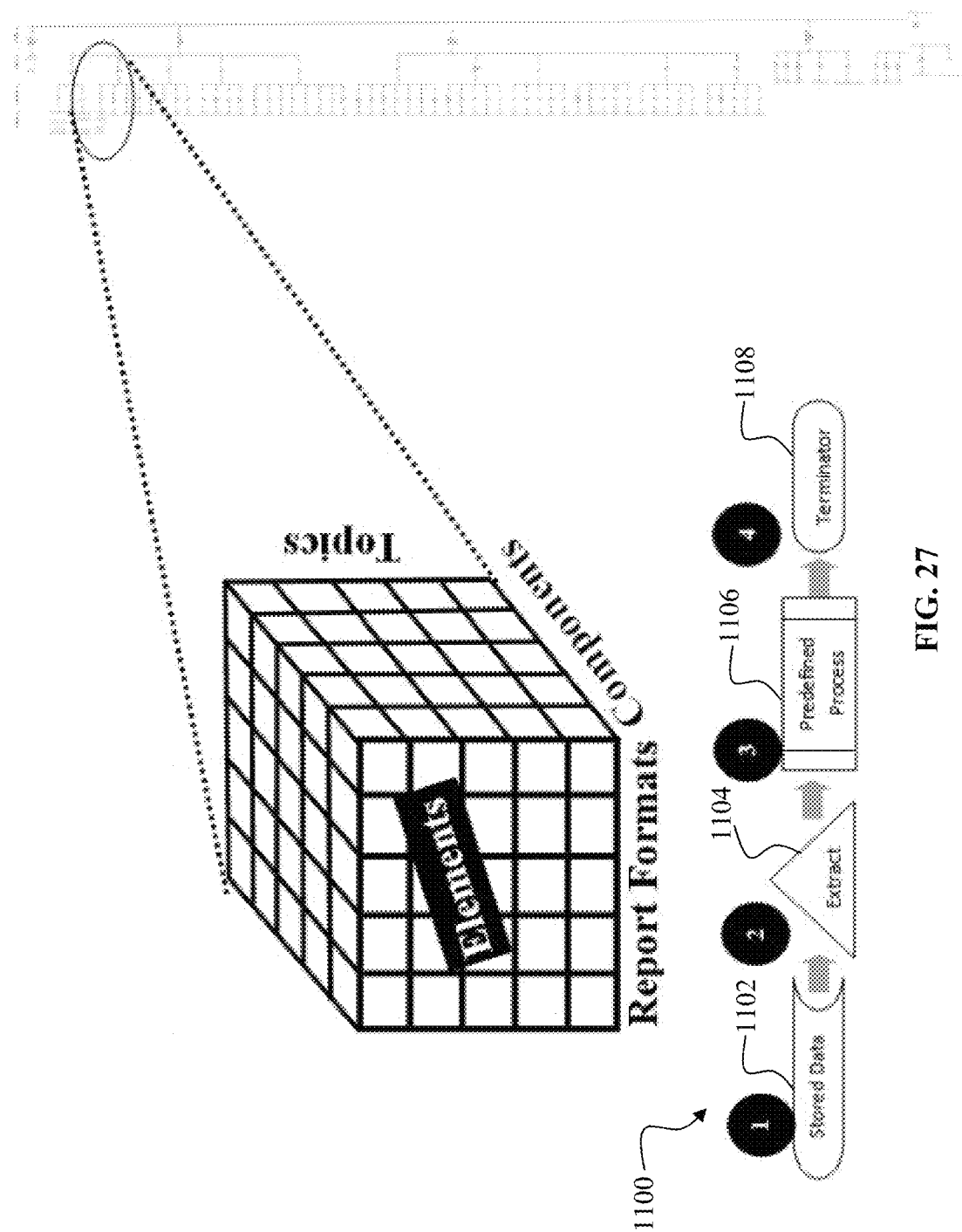
FIG. 27 is a diagram and flowchart of a trends and tracking generation process, according to an embodiment.

Referring to FIG. 27, a diagram and flowchart of a trends and tracking generation process 1100 is depicted. At stored data 1102, the analysis module opens the database. At extract 1104, the analysis module sequentially selects a current report set. At predefined process 1106, the analysis module writes a new record in each trend and tracking table reflective of the current report's content. At terminator 1108, the trends and tracking generation process is ended. In an embodiment, knowledge engine 406 comprises a report generator module to produce specialized reports based upon areas of interest, impact potential, and trend analysis. In an embodiment, the report generator module automates distribution of the specialized reports based upon a subscription list. Accessing important information during policy development can be critical. The report generator module is designed to maximize the opportunity to dynamically correct data.

Figure 28:
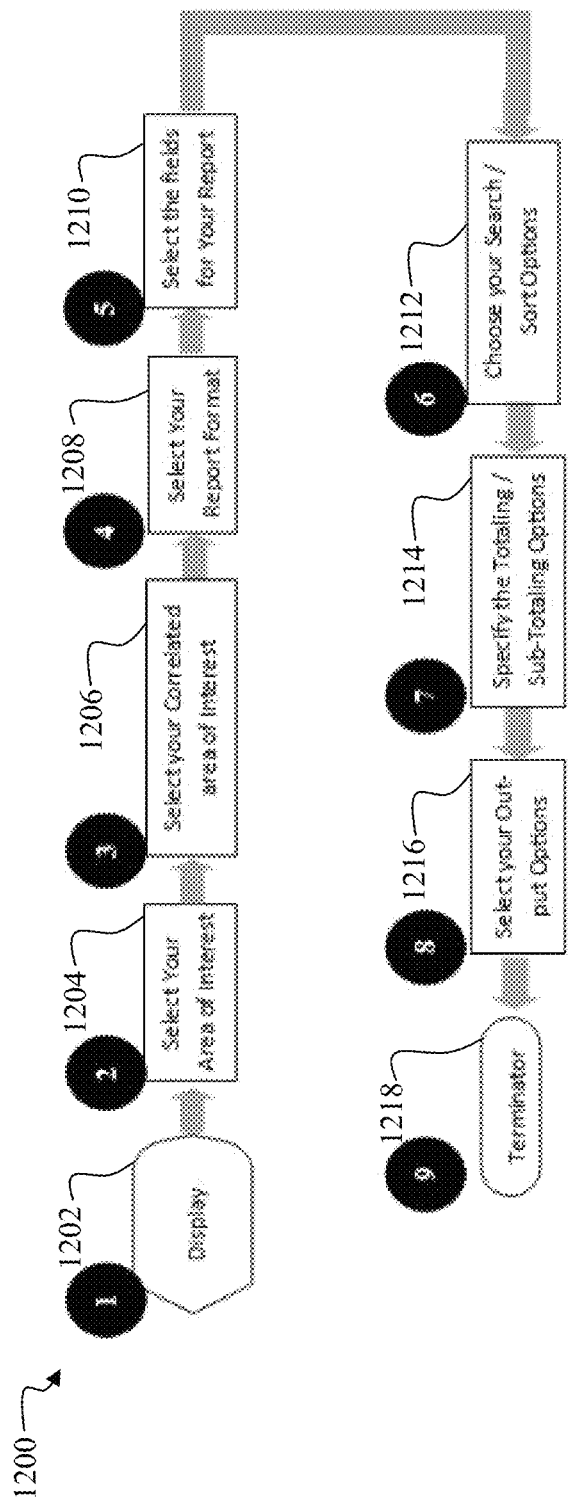
FIG. 28 is a flowchart of a report generation module, according to an embodiment.

Referring to FIG. 28, a diagram and flowchart of a report generator module process 1200 is depicted. At display 1202, the report generator module opens a report generator screen. At select your area of interest 1204, the primary area of interest is selected based on the desired nature of the report. At select your correlated area of interest 1206, a list of potential areas of interest that correlate to the primary area of interest are displayed. At select your report format 1208, the desired format of the report from the format list is selected. At select the fields for your report 1210, the fields to be displayed are selected. At choose your search and sort options 1212, the search criteria and sort order for the eligible fields are set. At specify the totaling and sub totaling options 1214, the totaling and sub-totaling options for the eligible fields are set. At select output options 1216, the output parameters are set. At terminator 1218, the report is generated according to the determined specifications.

In an embodiment, upon completion of the updating process, the report generation and tracking process begins. In an embodiment, pre-design report formats are assessed and the appropriate multi-dimensional arrays are generated within the system for each report generation and tracking process.

Figure 29:
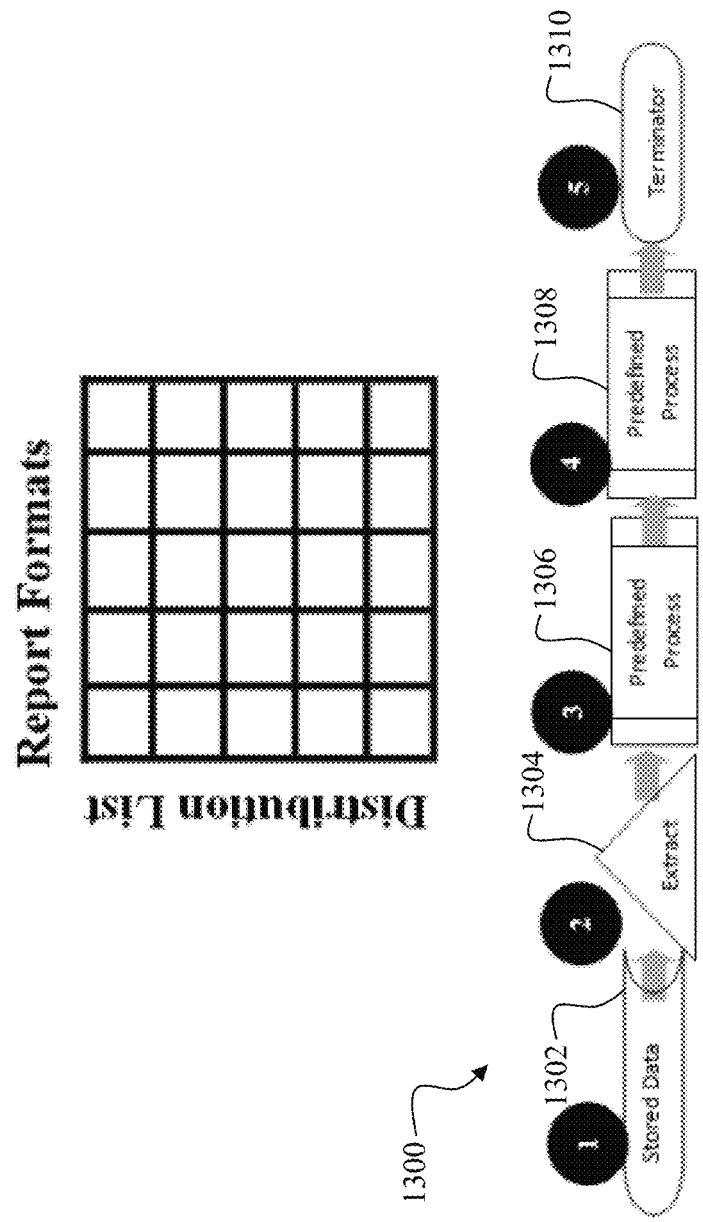
FIG. 29 is a diagram and flowchart of a report generation and distribution process, according to an embodiment.

Referring to FIG. 29, a diagram and flowchart of a report generation and tracking process 1300 is depicted. At stored data 1302, the report generation module opens the database. At extract 1304, the report generation module sequentially opens all report format records. At predefined process 1306, a multi-dimensional array is created for each report, and the necessary calculations are executed for each report. At terminator 1310, the report generation module ends the process.

In an embodiment, knowledge engine 406 comprises an inquiry module to provide access to data through a web portal. In an embodiment the inquiry module preformatted customizable reports with variable field selection, sorting, and totaling functions. Additionally, the inquiry module can allow for new format requests of existing reports.

Figure 30:
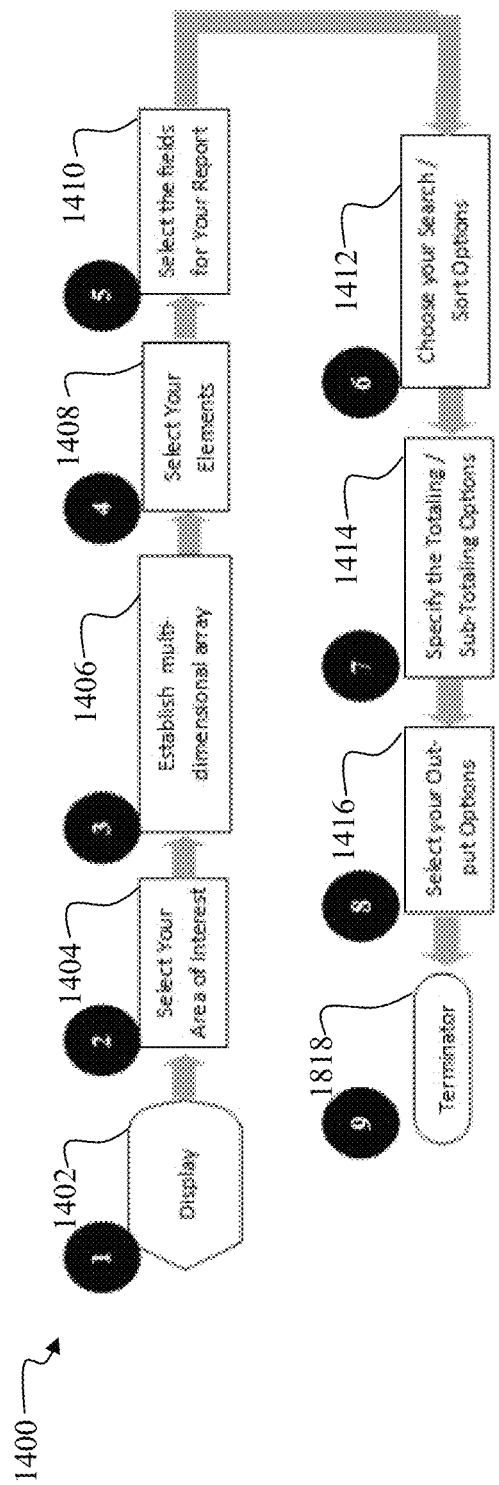
FIG. 30 is a flowchart of an inquiry module flow chart, according to an embodiment.

Referring to FIG. 30, a flowchart of an inquiry module process 1400 is depicted. At display 1402, the inquiry module opens the report generator screen. At select area of interest 1404, the primary area of interest is selected based on the desired nature of the inquiry. At establish multi-dimensional array 1406, a multi-dimensional array is established for components mating the area of interest. At select your elements 1408, a list of elements potentially correlated to the area of interest are displayed and the relevant elements are selected. At select the fields for your report 1410, the fields to be displayed are selected. At choose your search and sort options 1412, the search criteria and sort order for the eligible fields are set. At specify the totaling and sub totaling options 1414, the totaling and sub-totaling options for the eligible fields are set. At select output options 1416, the output parameters are set. At terminator 1418, the report is generated according to the determined specifications.

In an embodiment, the improved Smart Region architecture can comprise an e-consensus forum that strategically engages community members to become the voice of the community through their understanding of ongoing development of the public and private sector. The e-consensus forum is designed to be anonymous, inclusive, democratic, focused, and documented.

In an embodiment, the e-consensus forum is configured to include an issues formulation forum module that examines multiple concerns and prioritizes issues that must be resolved. In an embodiment, the issue formulation forum module uses component weights and scoring to determine issue prioritization.

In an embodiment, the e-consensus forum is configured to include a policy development forum module that brings stakeholders together to develop a policy consensus around identified community issues.

In an embodiment, the e-consensus forum is configured to include a smart region operations module that facilitates development of policies and operating guidelines to establish Smart Region infrastructure.

In an embodiment, the e-consensus forum is configured to include an election forum module that collects and categorizes community interests accumulated during an election period to hold elected stakeholders accountable.

In an embodiment, the e-consensus forum is configured to include an accountability forum to organize a response to an inappropriate event or action that has not been properly addressed.

Figure 31:
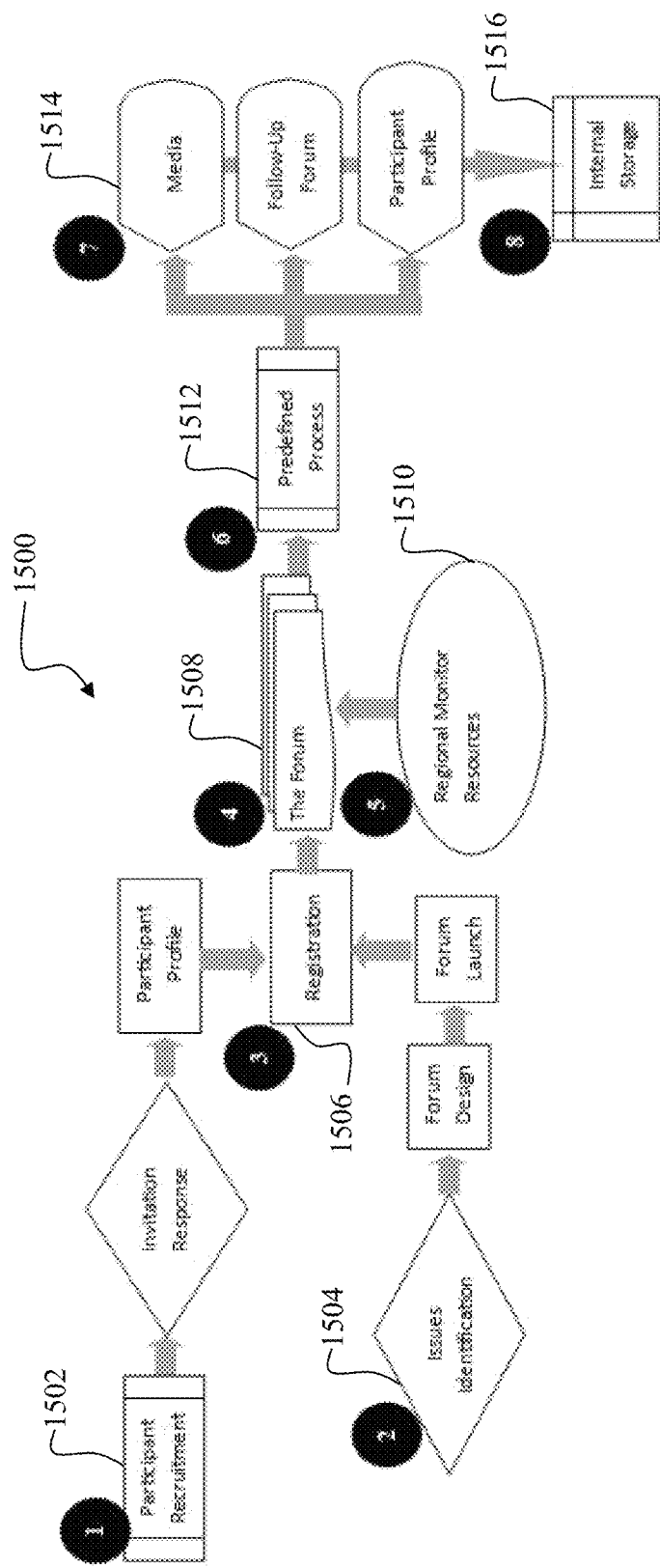
FIG. 31 is a flowchart of an e-consensus forum, according to an embodiment.

Referring to FIG. 31, a flowchart of an e-consensus forum process 1500 is depicted. At participant recruitment 1502, individuals respond to the outreach effort and a statistical profile is developed for each forum to determine if inherent biases are present. At issues modification 1504, forums are identified, designed, and scheduled for launch based on multiple inputs. At registration 1506, individuals are selected or register to participate in the chosen forum. At the forum 1508, the forums are conducted on or off site. At regional monitor resources 1510, resources for the forum participants to consider are provided as desired both before and during the forum. At predefined process 1512, the results are formatted for distribution upon conclusion of the forum. At media, follow up forum, and participant profile s 1514, a profile of the participants is prepared and incorporated into a report which is distributed to the media and relevant stakeholders. At internal storage 1516, the full documentation of the forum is archived in a reachable format.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "for" are recited in a claim.

The invention claimed is:

1. A system for coordinating a plurality of data sources, the system comprising:
   an index structure including:
      a first hierarchical data structure comprising a first hierarchical score based on a plurality of first-level elements, each of the plurality of first-level elements having a respective weighting, and
      a second hierarchical data structure comprising a plurality of second hierarchical scores based on a plurality of second-level elements, each of the plurality of second-level elements having a respective weighting, wherein the first hierarchical score is based on the plurality of second hierarchical scores through an index factor;
   a computing platform including computing hardware of at least one processor and memory operably coupled to the at least one processor; and
   instructions that, when executed on the computing platform, cause the computing platform to implement:
      a regional monitor engine configured to manage local access to a plurality of external data sources to coordinate writes to the index structure.

2. The system of claim 1, wherein the index factor maps a weighting to the first hierarchical score by at least one of the plurality of second hierarchical scores.

3. The system of claim 1, wherein the index structure further includes a third hierarchical data structure comprising a plurality of third hierarchical scores based on a plurality of third-level elements, and wherein at least one of the plurality of second hierarchical scores and the first hierarchical score are based on the plurality of third hierarchical scores through the index factor.

4. The system of claim 1, wherein the instructions that, when executed on the computing platform, cause the computing platform to further implement:
   a knowledge engine including:
      an input generator engine configured to automatically update the plurality of second-level elements,
      an auditor engine configured to automatically verify the update to the plurality of second-level elements, and
      an analyst engine configured to automatically evaluate the verified plurality of second-level elements, apply the index factor, and calculate the plurality of second hierarchical scores and the first hierarchical score.

5. The system of claim 4, wherein the input generator engine is configured to automatically update the plurality of second-level elements according to a time-based trigger or an event-based trigger.

6. The system of claim 4, wherein the analyst engine is further configured to:
apply a first regional profile to a first instance of the index structure for a first region;
apply a second regional profile to a second instance of the index structure for a second region; and
generate a comparison between the first region and the second region.

7. The system of claim 6, where in the first regional profile comprises a plurality of first profile elements, and the second regional profile comprises a plurality of second profile elements, wherein the first regional profile and the second regional profile have shared elements but different values for the plurality of first profile elements and the plurality of second profile elements.

8. The system of claim 4, wherein the knowledge engine further includes:
a report generator engine configured to create a pre-defined report based on the first hierarchical score and the plurality of second hierarchical scores; and
an inquirer engine configured to provide a user interface to access the pre-defined report.

9. The system of claim 8, wherein the inquirer engine is further configured to:
receive a request for a dynamic report via the user interface, the dynamic report including a plurality of criteria, and
wherein the report generator engine is further configured to create the dynamic report based on the plurality of criteria.

10. A method for coordinating a plurality of data sources, comprising:
providing an index structure including:
a first hierarchical data structure comprising a first hierarchical score based on a plurality of first-level elements, each of the plurality of first-level elements having a respective weighting, and
a second hierarchical data structure comprising a plurality of second hierarchical scores based on a plurality of second-level elements, each of the plurality of second-level elements having a respective weighting, wherein the first hierarchical score is based on the plurality of second hierarchical scores through an index factor;
managing local access to a plurality of external data sources to coordinate writes to the index structure;
updating the plurality of second-level elements from the plurality of external data sources;
verifying the update to the plurality of second-level elements;
evaluating the verified plurality of second-level elements;
applying the index factor; and
calculating the plurality of second hierarchical scores and the first hierarchical score.

11. The method of claim 10, further comprising:
identifying, profiling, and controlling a plurality of regional indicators to define the plurality of second-level elements.

12. The method of claim 10, wherein applying the index factor maps a weighting to the first hierarchical score by at least one of the plurality of second hierarchical scores.

13. The method of claim 10, further comprising:
automatically updating the plurality of second-level elements according to a time-based trigger or an event-based trigger.

14. The method of claim 10, further comprising:
applying a first regional profile to a first instance of the index structure for a first region;
applying a second regional profile to a second instance of the index structure for a second region; and
generating a comparison between the first region and the second region.

15. The method of claim 14, where in the first regional profile comprises a plurality of first profile elements, and the second regional profile comprises a plurality of second profile elements, wherein the first regional profile and the second regional profile have shared elements but different values for the plurality of first profile elements and the plurality of second profile elements.

16. The method of claim 10, further comprising:
creating a pre-defined report based on the first hierarchical score and the plurality of second hierarchical scores; and
providing a user interface to access the pre-defined report.

17. The method of claim 16, further comprising:
receiving a request for a dynamic report via the user interface, the dynamic report including a plurality of criteria, and
creating the dynamic report based on the plurality of criteria.

18. A system for coordinating a plurality of data sources, the system comprising:
means for providing an index structure including:
a first hierarchical data structure comprising a first hierarchical score based on a plurality of first-level elements, each of the plurality of first-level elements having a respective weighting, and
a second hierarchical data structure comprising a plurality of second hierarchical scores based on a plurality of second-level elements, each of the plurality of second-level elements having a respective weighting, wherein the first hierarchical score is based on the plurality of second hierarchical scores through an index factor;
means for managing local access to a plurality of external data sources to coordinate writes to the index structure;
means for updating the index structure from the plurality of external data sources according to a time-based trigger or an event-based trigger;
means for verifying the updated index structure; and
means for analyzing the verified index structure by evaluating the verified plurality of second-level elements, applying the index factor, and calculating the plurality of second hierarchical scores and the first hierarchical score.

* * * * *